US005739839A

United States Patent [19]

Iwai et al.

[11] Patent Number: 5,739,839

[45] Date of Patent: Apr. 14, 1998

[54] THERMAL PRINTER HAVING CARRIAGE AND HOLDER FOR MULTIPLE INK TAPE CASSETTES

[75] Inventors: Hiroji Iwai, Yamatokoriyama; Hirotoshi Iemura, Yamabe-gun; Atsushi Kadoya, Nara; Kunihiko Sakaguchi, Yamatokoriyama, all of Japan

[73] Assignee: Sharp Kabushiki Kaisha, Osaka, Japan

[21] Appl. No.: 452,401

[22] Filed: May 26, 1995

[30] Foreign Application Priority Data

Sep. 22, 1994 [JP] Japan .................................... 6-228227

[51] Int. Cl.$^6$ .............................. B41J 2/325; B41J 11/00; B41J 32/00; G01D 15/16

[52] U.S. Cl. .............................................................. 347/214

[58] Field of Search ..................................... 347/174, 176, 347/214, 172; 400/206, 206.2, 208, 247, 196; 346/29

[56] References Cited

U.S. PATENT DOCUMENTS

| | | | |
|---|---|---|---|
| 4,694,305 | 9/1987 | Shiomi et al. | 347/214 |
| 5,267,802 | 12/1993 | Parnell et al. | 400/208 |

FOREIGN PATENT DOCUMENTS

| | | |
|---|---|---|
| A-0-186892 | 7/1986 | European Pat. Off. . |
| 60-253578 | 6/1985 | Japan . |
| 60-196389 | 10/1985 | Japan . |
| 60-253578 | 12/1985 | Japan . |
| 61-158492 | 7/1986 | Japan . |

OTHER PUBLICATIONS

*Webster's New World Dictionary*, 3rd College Edition.

*Primary Examiner*—N. Le
*Assistant Examiner*—L. Anderson
*Attorney, Agent, or Firm*—Nixon & Vanderhye P.C.

[57] ABSTRACT

A thermal printer includes a carriage having a first holding device for detachably holding a cassette that incorporates an ink ribbon and a thermal printing head for effecting printing on a recording sheet through the ink ribbon; a guide track for guiding the carriage in a direction perpendicular to a feed direction of the recording sheet; a carriage driver for reciprocating the carriage along the guide track; a cassette holder having a plurality of second holding devices arranged in line each for detachably holding one cassette, one of the first and second holding devices having a pair of rigid holding members for detachably holding the cassette by relative movements in directions of gripping and releasing the cassette, and the other having a pair of elastic holding members for elastically holding the cassette by gripping it in between so that the cassette can be inserted into or pulled out from the elastic holding members; first mechanism for reciprocating the cassette holder between a waiting position and a delivering position while supporting the cassette holder so that an array of the second holding devices are parallel with and opposed to the guide track; second mechanism capable of causing the relative movements of the rigid holding members and a power source for continuously driving the first and second mechanisms.

12 Claims, 22 Drawing Sheets

THERMAL PRINTER HAVING CARRIAGE AND HOLDER FOR MULTIPLE INK TAPE CASSETTES

BACKGROUND OF THE INVENTION

1. Field of the Invention

The present invention relates to a thermal printer and, more specifically, to a ribbon cassette delivering structure of a thermal printer capable of color printing on which a plurality of ribbon cassettes are mounted.

2. Description of the Prior Art

When color printing is performed in conventional serial printing type thermal printers, a multi-color ink ribbon is used in which inks of three colors of yellow, magenta and cyan (hereinafter denoted by Y, M and C, respectively) or four colors of the above three colors plus black (hereinafter denoted by B) are applied to a single ink ribbon at a predetermined pitch (in different-colored parallel stripes). However, the manufacturing cost of this type of multi-color ink ribbon is high. Further, with such a multi-color ink ribbon, even when printing is performed over a width narrower than a prescribed printing width, a prescribed length of the ribbon is consumed including a portion that is fed uselessly. For example, even when color printing is performed over only 10 mm in the row direction of an A4 sheet, a length of the ribbon corresponding to the full printing width an A4 sheet is consumed most of which is fed uselessly. In addition, when printing of only B is performed with a multi-color ink ribbon of YMCB, YMC portions of the ribbon are not used at all but consumed in vain, i.e., fed uselessly.

To solve the above problems, Japanese Unexamined Patent Publication No. SHO. 60(1985)-253578 discloses a thermal printer in which ribbon cassettes of respective colors (four cassettes of YMCB or three cassettes of YMC) are individually stored in a cassette holder, and printing is performed such that necessary ribbon cassettes are moved automatically from the cassette holder to a carriage in a sequential manner (i.e., they are replaced with each other) in accordance with recording information. This type of thermal printer is classified into the following two types. In the first one, a cassette holder and a carriage are opposed to each other and a ribbon cassette is delivered by driving a solenoid provided on each of the cassette holder and the carriage. In the second one, a ribbon cassette is delivered by moving, along a carriage, a cassette holder that is opposed to the carriage.

However, the thermal printers disclosed in the publication SHO. 60(1985)-253578 have the following problems.

Because of the structure in which a plurality of ribbon cassettes are held by magnetic force of permanent magnets mounted on the cassette holder and the carriage, there may occur a problem that a ribbon cassette drops due to vibration or impact at a ribbon cassette delivering operation, for instance. This causes a problem in thinning the device by modifying the arrangement of the cassette holder and the carriage. More specifically, when it is intended to thin the device by opposing the cassette holder and the carriage in the vertical direction, the holding of the ribbon cassette becomes less stable on the top side. Increasing the force of holding the ribbon cassette by increasing the number of permanent magnets or using a permanent magnet generating stronger magnetic force causes a cost increase.

Further, to hold the respective ribbon cassettes by magnetic force, a magnetic material such as a magnet or metal needs to be employed in each ribbon cassette. Therefore, dedicated ribbon cassettes are needed; that is, general-purpose ribbon cassettes cannot be used, increasing the cost of the ribbon cassettes. In addition, the use of the solenoid for removing a ribbon cassette from the cassette holder or the carriage against the magnetic force of the permanent magnet makes the device larger or increases the cost.

Vibration or impact at a printing operation, a ribbon cassette delivering operation, and other operations may loosen an ink ribbon of a ribbon cassette being held by the carriage. As a result, when the ribbon cassette is again mounted on the carriage after once returned to the cassette holder, the ink ribbon may not be placed at a prescribed position, resulting in its twining about a recording head.

When a ribbon cassette is removed from the cassette holder and mounted on the carriage, there occurs a ribbon cassette lacking portion in the cassette holder. In this case, a wiring member such as a flexible wiring member that is connected to the carriage may enter the lacking portion and be hooked by the cassette holder side. This will cause a problem that the wiring member is damaged or the printing operation is disabled.

The publication SHO. 60(1985)-253578 discloses another thermal printer having a plurality of ribbon cassettes that are stacked in multiple levels. Printing is effected such that the ribbon cassette groups are moved perpendicularly to the recording head moving direction in accordance with recording information. However, this type of printer increases the size of the device because it requires a space for the movement of the ribbon cassette groups.

SUMMARY OF THE INVENTION

The invention provides a thermal printer comprising: a carriage having first holding means for detachably holding a cassette that incorporates an ink ribbon and a thermal printing head for effecting printing on a recording sheet through the ink ribbon; a guide track for guiding the carriage in a direction perpendicular to a feed direction of the recording sheet;a carriage driver for reciprocating the carriage along the guide track; a cassette holder having a plurality of second holding means arranged in line each for detachably holding one cassette, one of the first and second holding means having a pair of rigid holding members for detachably holding the cassette by relative movements in directions of gripping and releasing the cassette, and the other having a pair of elastic holding members for elastically holding the cassette by gripping it in between so that the cassette can be inserted into or pulled out from the elastic holding members; first mechanism for reciprocating the cassette holder between a waiting position and a delivering position while supporting the cassette holder so that an array of the second holding means are parallel with and opposed to the guide track; second mechanism capable of causing the relative movements of the rigid holding members; and a power source for driving the first and second mechanisms in linked mortion.

BRIEF DESCRIPTION OF THE DRAWINGS

FIG. 1(*b*) is a perspective view of the process unit in a state that the cassette holder is located at a waiting position;

FIG. 1(*c*) is a perspective view of the process unit in a state that the cassette holder is located at a delivering position;

FIG. 1(*d*) is a perspective view of the process unit in a state that a ribbon cassette is mounted on a carriage;

FIG. 4(*b*) is a perspective view showing a side portion of the ribbon cassette where an ink ribbon is not exposed;

FIG. 4(*c*) is a perspective view showing a cross-section of a core of the ribbon cassette;

FIG. 7(*b*) shows a state that the cassette holder is closed completely;

FIG. 7(*c*) shows a state that the cassette holder is moved to the waiting position;

FIG. 19(*b*) is a perspective view of the tightening mechanism when the engaging body is opened;

FIG. 21(*b*) shows a state that the cable of the carriage enters the ribbon cassette lacking portion of the cassette holder;

FIG. 22(*b*) shows a state that the projecting member is projected;

DESCRIPTION OF THE PREFERRED EMBODIMENT

Figure 1:
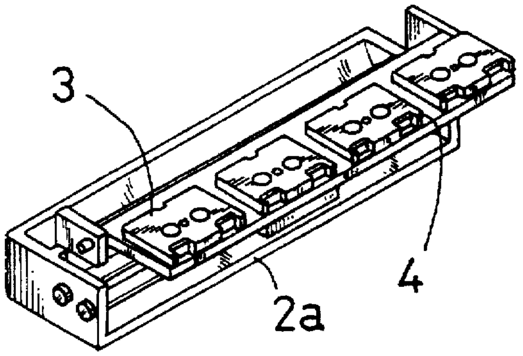
FIG. 1(*a*) is a perspective view of a process unit of a thermal printer according to an embodiment of the present invention in a state that a cassette holder is opened.
Figure 1:
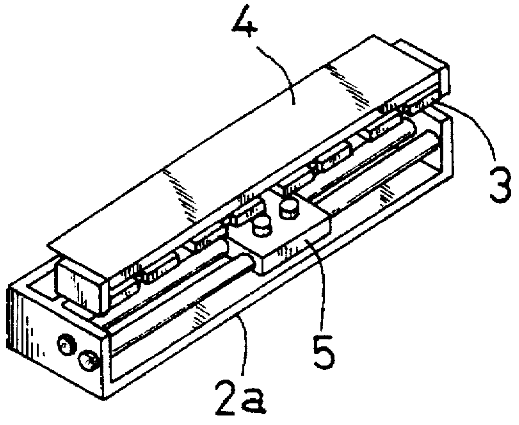
Figure 1:
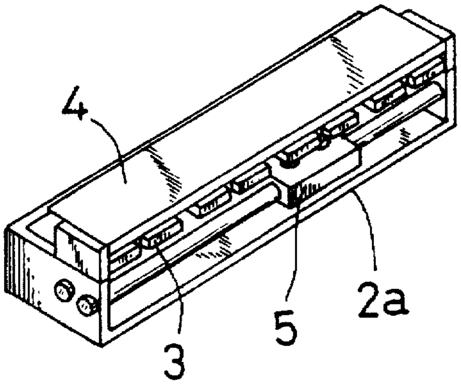
Figure 1:
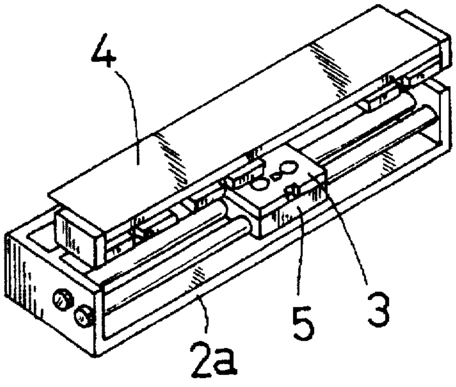

In the present invention, one of the first and second holding means, which are provided on the carriage and the cassette holder and detachably hold a cassette, has a pair of rigid holding members for detachably holding the cassette by relative movements in directions of gripping and releasing the cassette. For example, at least one of the rigid holding members is a movable member that moves to engage one side of the cassette. The other of the first and second holding means has a pair of elastic holding members for elastically holding the cassette by gripping it in between so that the cassette can be inserted into or pulled out from the elastic holding members. For example, the elastic holding members are a pair of leaf springs that are erected from the carriage or cassette holder in parallel with each other.

The cassette held by the rigid holding members is gripped and held by the rigid holding members when the cassette holder is located at the delivering position, and pulled out from the elastic holding members and delivered to the rigid holding members when the cassette holder leaves the delivering position.

Although either of the first and second holding means may have the rigid holding members, to simplify the mechanism of causing the rigid holding members to operate, it is preferred that the second holding means have the rigid holding members.

As described above, according to the invention, since the cassette is mechanically held by the carriage and the cassette holder in a positive manner, the cassette may made of any material whether it is a magnetic or non-magnetic material.

The waiting position is a position where the cassette holder is separated from the guide track so that the cassette mounted on the cassette holder does not contact with the cassette mounted on the carriage, and the delivering position is a position where the cassette holder comes close to the guide track so that the cassette held by the cassette holder can contact with the carriage.

The power source may be a reversible motor. The first mechanism may reciprocate the cassette in accordance with rotation of the reversible motor, and the second mechanism selectively may perform first and second operations corresponding to normal and reverse rotations of the reversible motor when the carriage is opposed to one of the second holding means. The first operation is an operation of releasing the cassette after the rigid holding members insert the cassette between the elastic holding members, and the second operation is an operation performed by the rigid holding members of gripping and pulling out the cassette held by the elastic holding members.

The first mechanism may include a first cam that is rotated by the reversible motor via a first guide groove, and a link mechanism for reciprocating the cassette holder while engaging the first guide groove, in which the first guide groove is so shaped as to enable the reciprocal movement of the cassette holder irrespective of a rotation direction of the reversible motor.

The second mechanism may include a second cam having a second guide groove and rotated by the reversible motor, and a lever for causing rock members to operate while engaging the second guide groove, in which the second guide groove is so shaped that the first operation is effected for the normal rotation of the reversible motor and that the second operation is effected for the reverse rotation of the reversible motor.

The first and second cams may be unified as a single gear that is rotated by the reversible motor, in which the first and second guide grooves are respectively formed in front and back surfaces of the gear.

The printer may further be provided with means for detecting one of the second holding means that is opposed to the carriage when the cassette holder is located at the delivering position, and means for allowing the second mechanism to move the rigid holding members of only the detected second holding means.

It is preferred that the printer be further provided with means for tightening the ink ribbon of the cassette when the second holding means receives the cassette from the first holding means.

The cassette holder may further have projecting members that project toward the guide track in place of the cassette when the corresponding second holding means does not hold the cassette.

Figure 2:
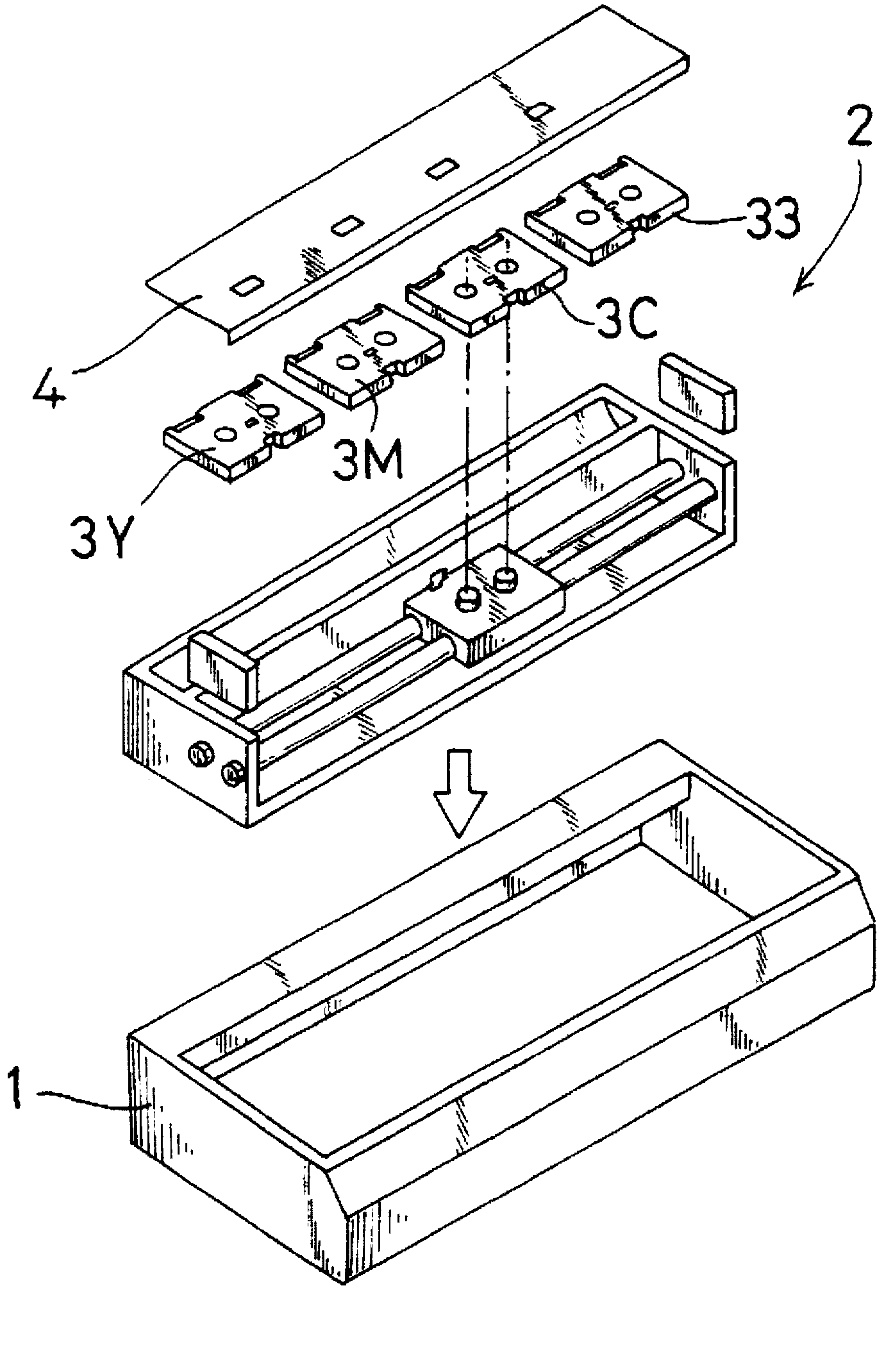
FIG. 2 is an exploded perspective view of the thermal printer of the embodiment.

Referring to FIG. 2, a serial printing type multi-color thermal printer according to an embodiment of the invention is composed of a box-shaped case (printer main body) 1 and a process unit 2 that is incorporated in the case 1. This printer forms a color image on a recording sheet according to the known additive color mixture using ribbon cassettes 3 of Y, M, C and B.

Figure 3:
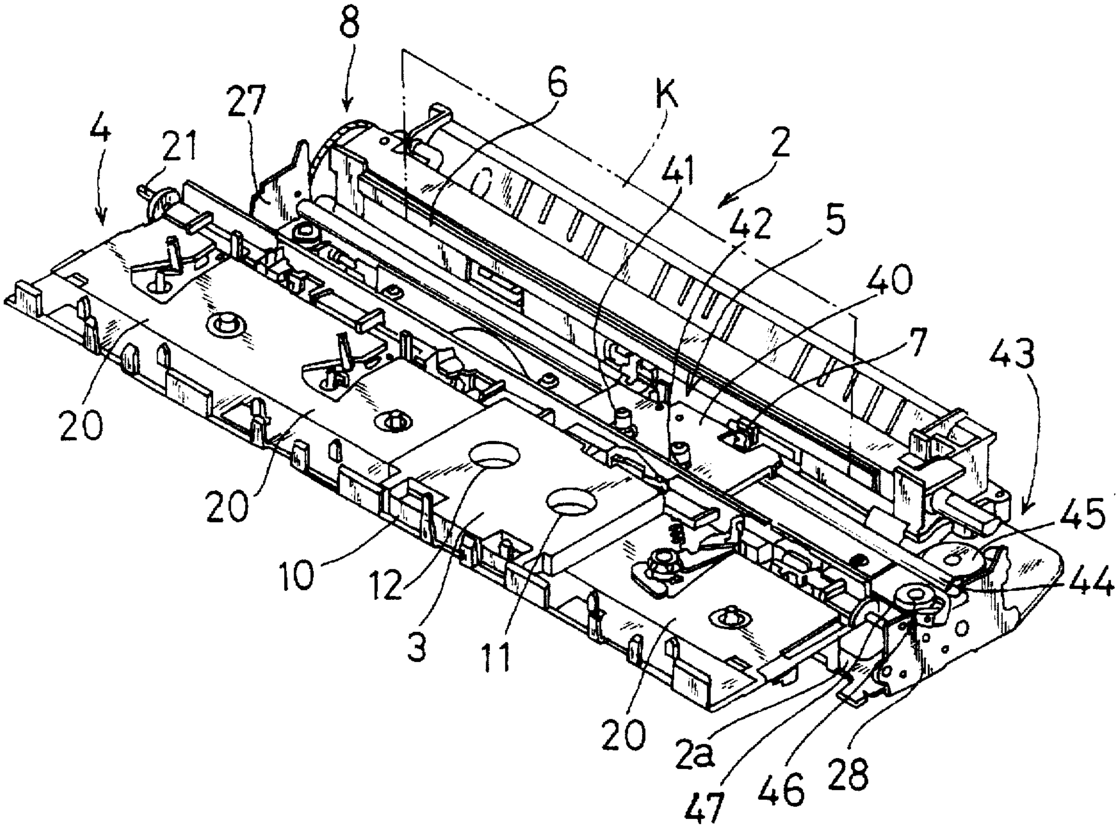
FIG. 3 is a perspective view of the process unit of the embodiment in a state that the cassette holder is located at the mounting position.

Referring to FIGS. 1(*a*)–1(*d*) and FIG. 3, the process unit 2 has a frame 2*a*. A cassette holder 4 is mounted on the frame 2*a* so as to be able to open and close and move vertically and horizontally, and holds the four ribbon cassettes 3 arranged horizontally. A carriage 5 is also mounted on the frame 2*a* so as to be capable of reciprocal movement in the direction perpendicular to the feeding direction of a recording sheet K, and holds a selected one of the four ribbon cassettes 3. The position of the cassette holder 4 can be selected among a waiting position where it is opposed to the carriage 5 with a such distance as causes no problem to the reciprocal movement of the carriage 5 (see FIGS. 1(*b*) and 1(*d*)), a delivering position where the cassette holder 4 is located below the waiting position so as to be adjacent to the carriage 5, to allow one of the ribbon cassettes 3 to be delivered to the carriage 5 (see FIG. 1(*c*)), and a mounting position where the cassette holder 4 is moved forward in the horizontal direction from the waiting position and opened by 180° to allow mounting of the ribbon cassettes 3 on the cassette holder 4 that is located at a top-front position of the case 1 (see FIG. 1(*a*)). FIG. 3 shows the process unit 2 in the state that the cassette holder 4 is located at the mounting position. In FIG. 3, reference numeral 6 denotes a platen that extends in a direction (hereinafter called a right-left direction) parallel with the movement direction of the carriage 5; 7, a recording head (thermal head) mounted on the carriage 5 so as to face the platen 6; and 8, a sheet feeding device consisting of a drive motor, a feed roller, etc. and serving to feed a recording sheet to the position between the platen 6 and the recording head 7.

Ink ribbons 10 of Y, M, C and B are incorporated in the four respective ribbon cassettes 3. That is, the four kinds of ribbon cassettes 3 of the different colors (Y, M, C and B) enable color printing. Alternatively, B ink ribbons of different densities may be incorporated in a plurality of ribbon cassettes 3 to enable gradational printing. As a further alternative, a B ink ribbon and an ink ribbon of one of red, green, gold, etc. may be incorporated in the respective ribbon cassettes 3.

Figure 4:
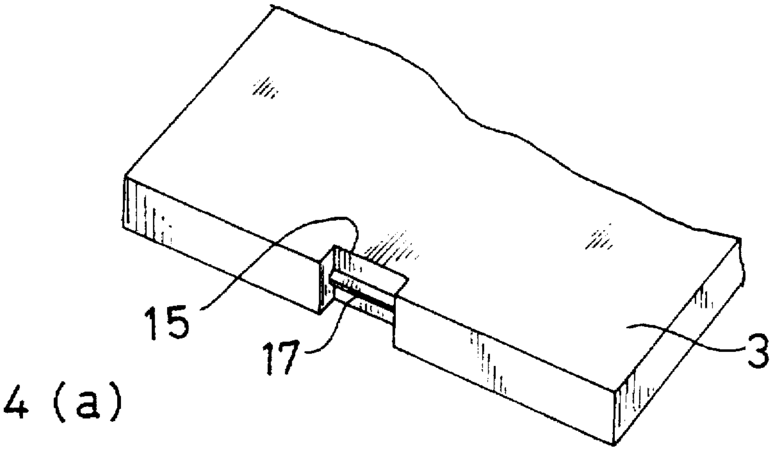
FIG. 4(*a*) is a perspective view of the ribbon cassette of the embodiment.
Figure 4:
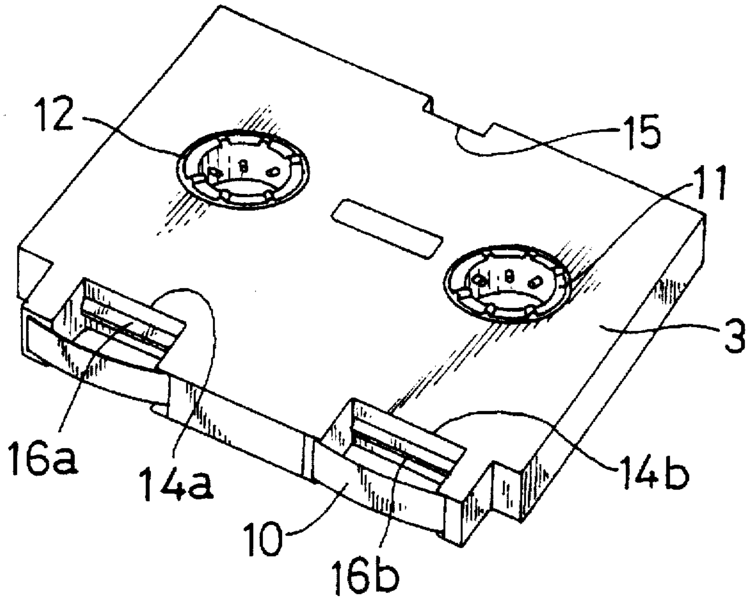
Figure 4:
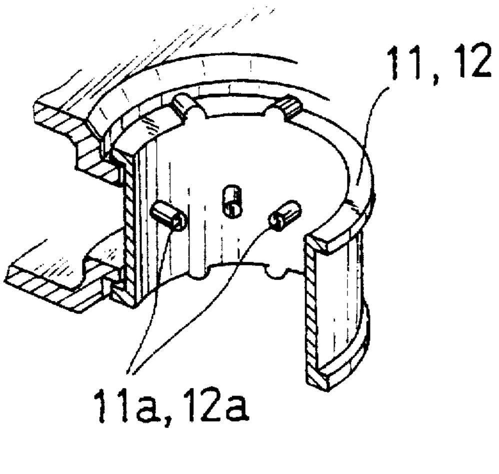

FIGS. 4(*a*)–4(*c*) show a structure of each ribbon cassette 3. A cylindrical ribbon supply core 11 on which the ink ribbon 10 is wound and a cylindrical ribbon take-up core 12 for winding up the ink ribbon 10 from the ribbon supply core 11 are rotatably incorporated in a rectangular parallelepiped cassette case on the market that is integrally molded with a synthetic resin. The inside walls of the ribbon supply core 11 and the ribbon take-up core 12 are formed with engaging protrusions 11*a* and 12*a* that are arranged at regular intervals and project inward.

A side face of the ribbon cassette 3 to be opposed to the thermal head 7 is formed with a pair of cuts 14*a* and 14*b* at positions where the ink ribbon 10 is exposed, and another side face of the ribbon cassette 3 to be located opposite to the thermal head 7 is formed with a cut 15 smaller than the cuts 14*a* and 14*b* at the center position. Generally triangular engaging nails 16*a* and 16*b* are protruded in the respective cuts 14*a* and 14*b*, and a generally triangular engaging nail 17 is protruded in the cut 17.

Figure 5:
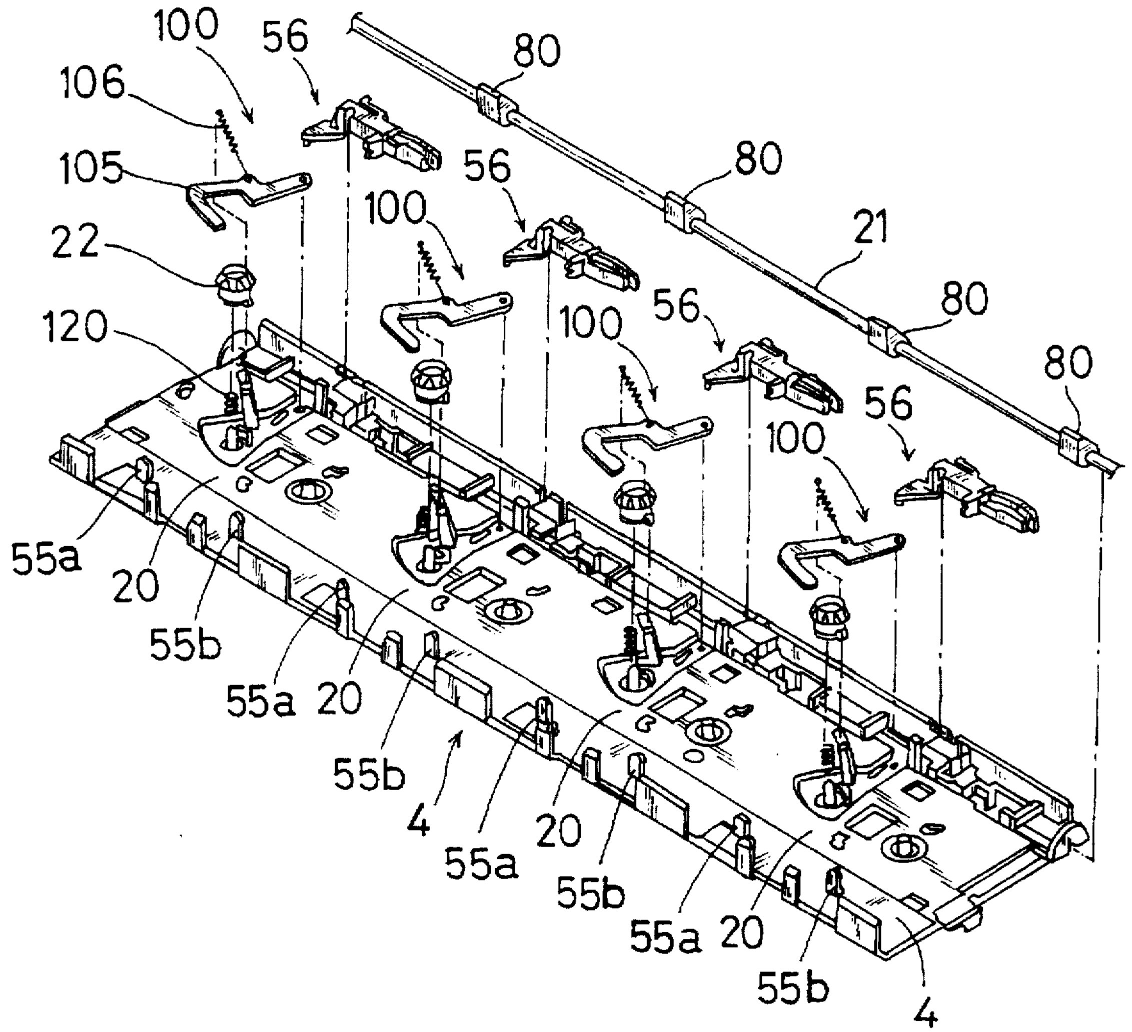
FIG. 5 is an exploded perspective view of the cassette holder of the embodiment.

As shown in FIGS. 3 and 5, the cassette holder 4 is a plate that is long in the right-left direction, and four cassette mounting portions 20 each of which is somewhat wider than the ribbon cassette 3 are arranged in line in the longitudinal direction of the ribbon cassette 3, i.e., in the right-left direction. The ribbon cassettes 3 are mounted in place so as to be arranged in line in the longitudinal direction by inserting their ribbon take-up cores 12 and ribbon supply cores 11 into rotary shafts (ribbon take-up bodies) 22 and rotation preventing bodies 23 (described later) that are provided on the respective cassette mounting portions 20 (see FIG. 18). The number of ribbon cassettes 3 to be mounted on the cassette holder 4 is not limited to four, but may be less or more than four.

Figure 6:
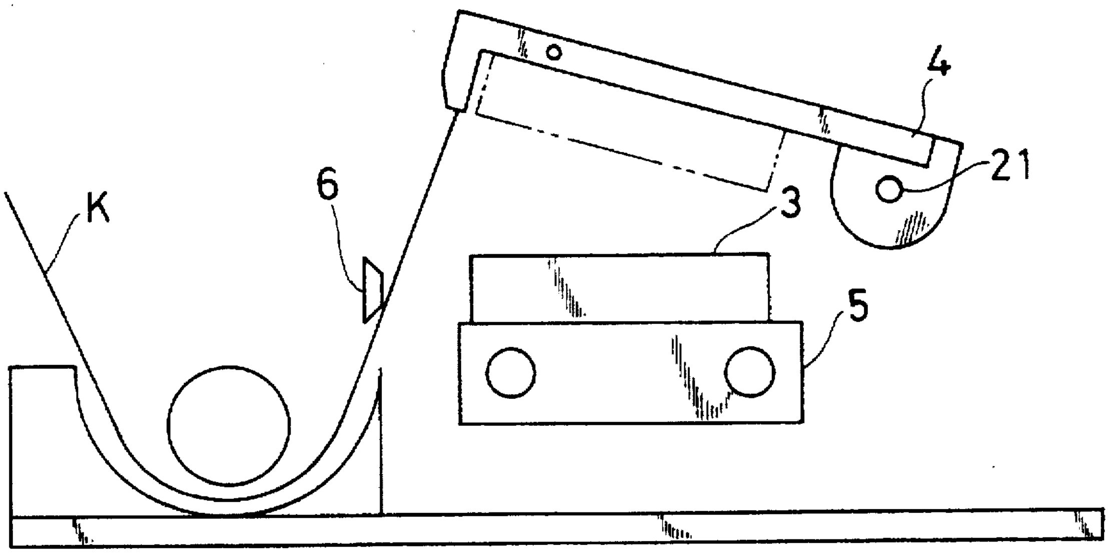
FIG. 6 illustrates a state that the cassette holder is closed at a position close to a recording sheet.

As shown in FIGS. 3 and 6, the cassette holder 4 is rotatably supported by a rotary shaft 21 extending in the right-left direction, and can rotate by about 180° to thereby open or close. As shown in FIG. 6, if there is employed a structure in which the cassette holder 4 is allowed to open or close at the waiting position where it is opposed to the carriage 5, when the cassette holder 4 is rotated from the mounting position in the closing direction, the end portion of the cassette holder 4 may hit the tip of a recording sheet K, to bend or break it. To solve this problem, as shown in FIGS. 7(*a*)–7(*c*), a horizontal movement mechanism 25 for horizontally moving the cassette holder 4 in the direction (front-rear direction) of causing the cassette holder 4 to approach or go away from the recording sheet K, and a rotation restricting mechanism 26 for allowing rotation of the cassette holder 4 only when it is at a position distant from the recording sheet K.

Figure 7A:
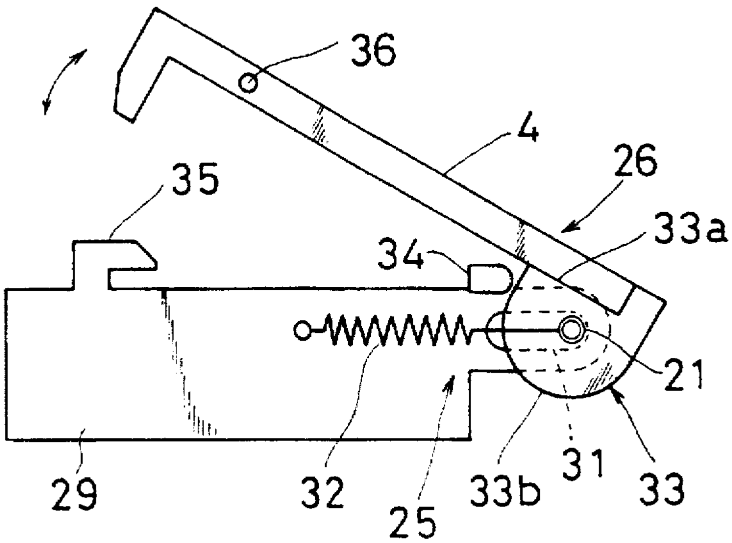
FIG. 7(*a*) shows a state that the cassette holder is closed at a position distant from the recording sheet in the embodiment.
Figure 7B:
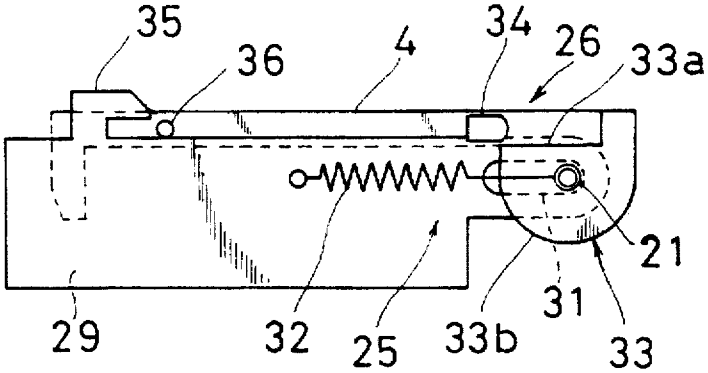
Figure 7C:
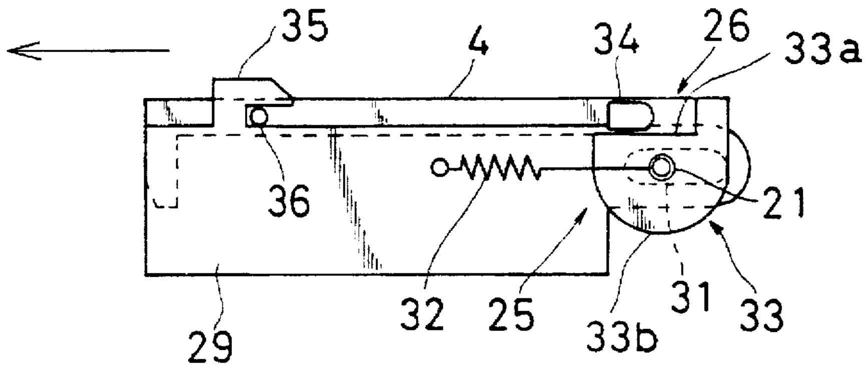

As shown in FIG. 3 and 7(*a*)–7(*c*), the rotary shaft 21 is supported by a pair of flat plates 29 and 30 that are provided on left and right side walls 27 and 28 of the frame 2*a* so as to be movable vertically, and fitted in a front end portion of the cassette holder 4.

The horizontal movement mechanism 25 is composed of elongated hole bearings 31 that are formed in the plates 29 and 30 at the front side and serve to guide the rotary shaft 21 in the front-rear direction, and springs 32 for urging the rotary shaft 21 backward. One ends of the springs 32 are connected to bearings (not shown) of the rotary shaft 21 and the other ends are connected to the plates 29 and 30.

The rotation restricting mechanism 26 is composed of generally semi-circular angle restricting plates 33 provided on both sides of a front end portion of the cassette holder 4, and ribs 34 that are protruded from the plates 29 and 30 and allow rotation of the angle restricting plates 33 only when the rotary shaft 21 is located at a front position in the elongated hole bearings 31. The angle restricting plates 33 have horizontal faces 33*a* that slide while contacting with the ribs 34, and circumferential faces 33*b*.

Figure 8:
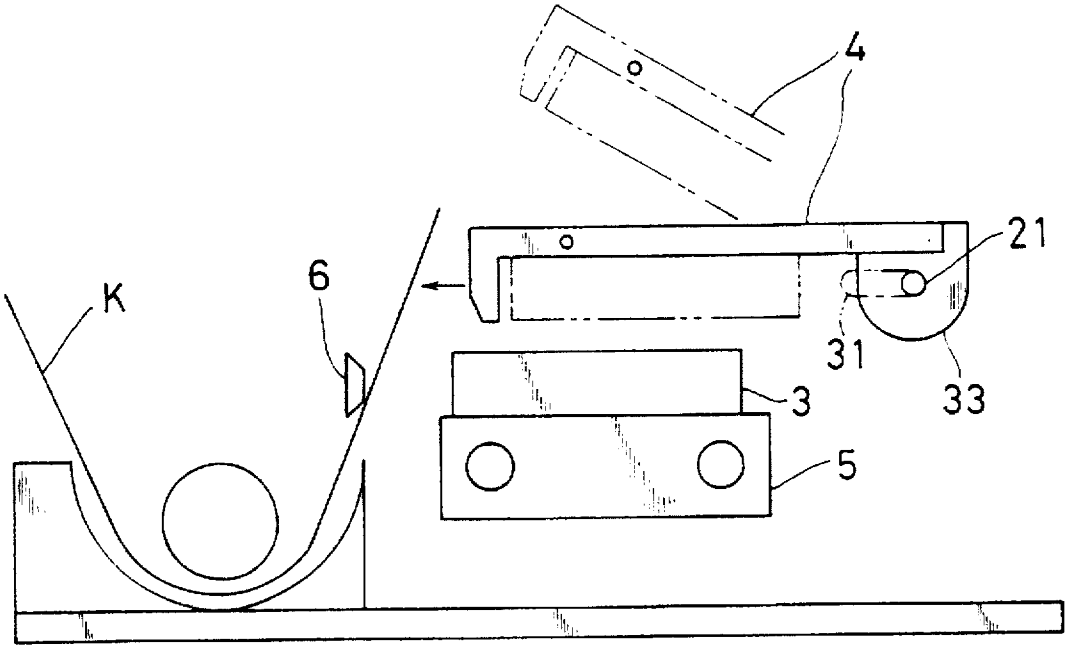
FIG. 8 shows a state that the cassette holder is closed at the position distant from the recording sheet in the embodiment.

With the above structure, when the cassette holder 4 is closed from the mounting position, although the rotary shaft 21 is urged backward by the springs 32, the ribs 34 abut the circumferential faces 33*b* of the angle restricting plates 33, to prevent the cassette holder 4 from moving backward (see FIG. 7(*a*)). Thus, the cassette holder 4 is allowed to open or close only at the position distant from the recording sheet K. When the cassette holder 4 is closed completely to provide a state that the ribs 34 no longer abut the circumferential faces 33*b* of the angle restricting plates 33 (see FIG. 7(*b*)), the rotary shaft 21 is pulled backward by the springs 32 and the horizontal faces 33*a* of the angle restricting plates 33 thereby slide along the ribs 34, that is, the cassette holder 4 moves backward in the horizontal direction (see FIG. 7(*c*)). In this manner, the cassette holder 4 can be closed without contacting with the recording sheet K as shown in FIG. 8. On the other hand, the cassette holder 4 is opened from the waiting position where it is opposed to the carriage 5 after it is moved forward in the horizontal direction.

In FIGS. 7(*a*)–7(*c*), reference numeral 35 denotes ribs that are integrally molded with the plates 29 and 30 so as to be located on the top thereof, and abut protrusions 36 of the cassette holder 4 to thereby restrict the backward movement of the cassette holder, i.e., its position relative to the platen 6, and hold the cassette holder 4 at the waiting position.

Figure 20:
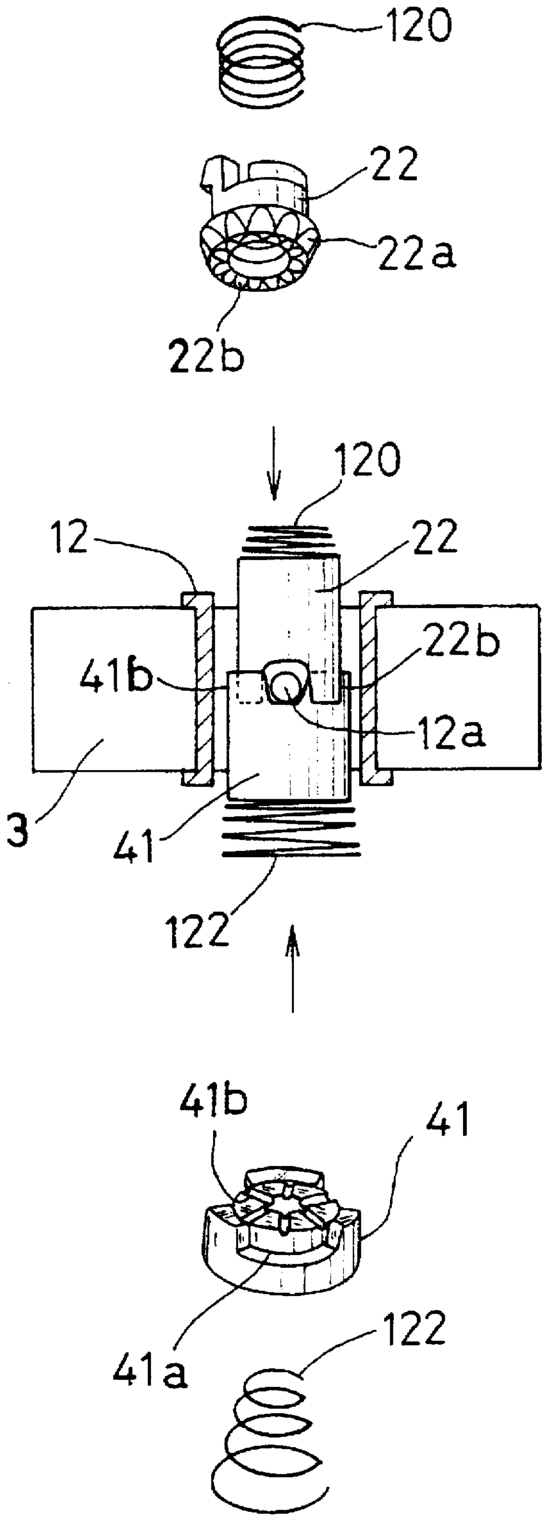
FIG. 20 shows a state that a ribbon take-up body and a ribbon take-up shaft are engaged with each other in the embodiment.

Referring to FIG. 3, the carriage 5 has a single cassette mounting plate 40 that is somewhat wider than the ribbon cassette 3. The cassette mounting plate 40 is provided with a rotation-drivable ribbon take-up shaft 41 to be inserted into the ribbon take-up core 12 of the ribbon cassette 3 and a rotatable ribbon supply shaft 42 to be inserted into the ribbon supply core 11 of the ribbon cassette 3. As shown in FIG. 20, the ribbon take-up shaft 41 has an engaging portion 41*a* to engage the engaging protrusions 12*a* of the ribbon take-up core 12. The carriage 5 is reciprocally moved by a carriage driver 43 while being guided by a carriage shaft (guide track) 44. The carriage driver 43 has a mechanism in which driving force of a reverse-rotatable drive motor (not shown) is transmitted, via a gear 45 and a pulley 46, to a timing belt 47 that is wound on the pulley 46. The carriage 5 is connected to the timing belt 47.

The process unit 2 is provided with a cassette delivering means for delivering the ribbon cassette 3 between the cassette holder 4 and the carriage 5. The cassette delivering means has a plurality of cassette holding mechanisms (second holding means) 50 that are provided in the respective cassette mounting portions 20 of the cassette holder 4 and are switchable between a holding form for engaging the ribbon cassette 3 and a releasing form for releasing the engagement (see FIGS. 9–11), a cassette mounting mechanism 51 that is provided on the cassette mounting plate 40 of the carriage 5 for mounting the ribbon cassette 3 (see FIGS. 9–11), a vertical movement mechanism (first mechanism) 52 for vertically moving the cassette holder 4 (see FIG. 14), and a linked motion mechanism (second mechanism) 53 that operates in link with the vertical movement mechanism 52 to switch the form of the cassette holding mechanism 50 (see FIG. 16).

As shown in FIGS. 5 and 9–11, the cassette holding mechanism 50 has a pair of fixed engaging portions (rigid holding members) 55*a* and 55*b* to engage the engaging nails 16*a* and 16*b* of the ribbon cassette 3 and a movable engaging portion (rigid holding member) 56 to engage the engaging nail 17 of the ribbon cassette 3. The fixed engaging portions 55*a* and 55*b* are integral with the cassette mounting portion 20 and erected therefrom at a rear position, and have respective cuts for engagement. As Shown in FIG. 12, the movable engaging portion 56 is composed of a generally L-shaped movable body 58 that is rotatably supported by a shaft 57 that is integrally molded with the cassette mounting portion 20 at a front position, an engaging body 59 that projects from the movable body 58 toward the ribbon cassette 3 and has a cut for engagement, a spring 60 for urging the movable body 58 in direction A (in the direction of engaging the engaging body 59 with the engaging nail 17), a latch 62 that is rotatably mounted on the movable body 58 through a shaft 61 and enables switching of the form of the cassette holding mechanism 50, and a spring 63 for urging the latch 62 in direction C. The latch 62 is inserted in a groove 64 that is formed in the movable body 58, and projects from the movable body 58.

To mount the ribbon cassette 3 to the carriage 5 from the cassette holding mechanism 50 without dislocating the ribbon cassette 3 horizontally, it is necessary to release the holding of the cassette holding mechanism 50 by opening both of the fixed engaging portions 55*a* and 55*b* and the movable body 59 of the cassette holding mechanism 50 that are holding the ribbon cassette 3 so that they go away from each other. However, it is likely that in a limited space a structure for opening or closing the fixed engaging portions 55*a* and 55*b* and the engaging body 59 with respect to the nails on both sides becomes complex, to lower the reliability. In the above cassette holding mechanism 50, one side is of a fixed type, and when the cassette holder 4 is at the delivering position, the engaging body 59 on the other side is opened to release the engagement with the engaging nail 17 of the ribbon cassette 3. When the cassette holder 4 is moved right upward with the engaging body 59 opened, the ribbon cassette 3 might be hooked by the fixed engaging portions 55*a* and 55*b* because they are left engaged with the engaging nails 16*a* and 16*b* of the ribbon cassette 3. That is, the ribbon cassette 3 is not removed in a positive manner.

To avoid the above problem, i.e., to prevent the engaging nails 16*a* and 16*b* from being hooked by the fixed engaging portions 55*a* and 55*b* when the cassette holder is moved upward, the cassette holder 4 is provided with play in the direction in which the engagement between the fixed engaging portions 55*a* and 55*b* and the engaging nails 16*a* and 16*b* is released.

Figure 13:
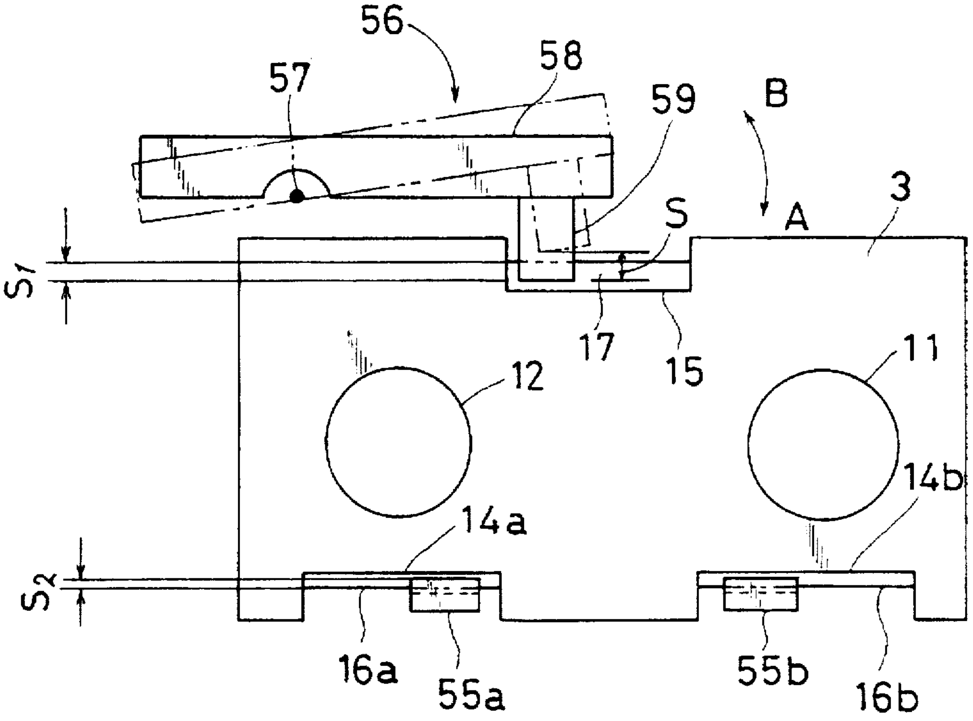
FIG. 13 shows an opening/closing stroke of an engaging body of the embodiment.

To allow the engagement with the nails on both sides to be released only by operation of the engaging body 59, an opening/closing stroke S of the engaging body 59 is set longer than an engaging amount S1 of the engaging body 59 and the engaging nail 17 plus an engaging amount S2 of the fixed engaging portions 55*a* and 55*b* and the engaging nails 16*a* and 16*b* ($S>S1+S2$), as shown in FIG. 13.

Figure 9:
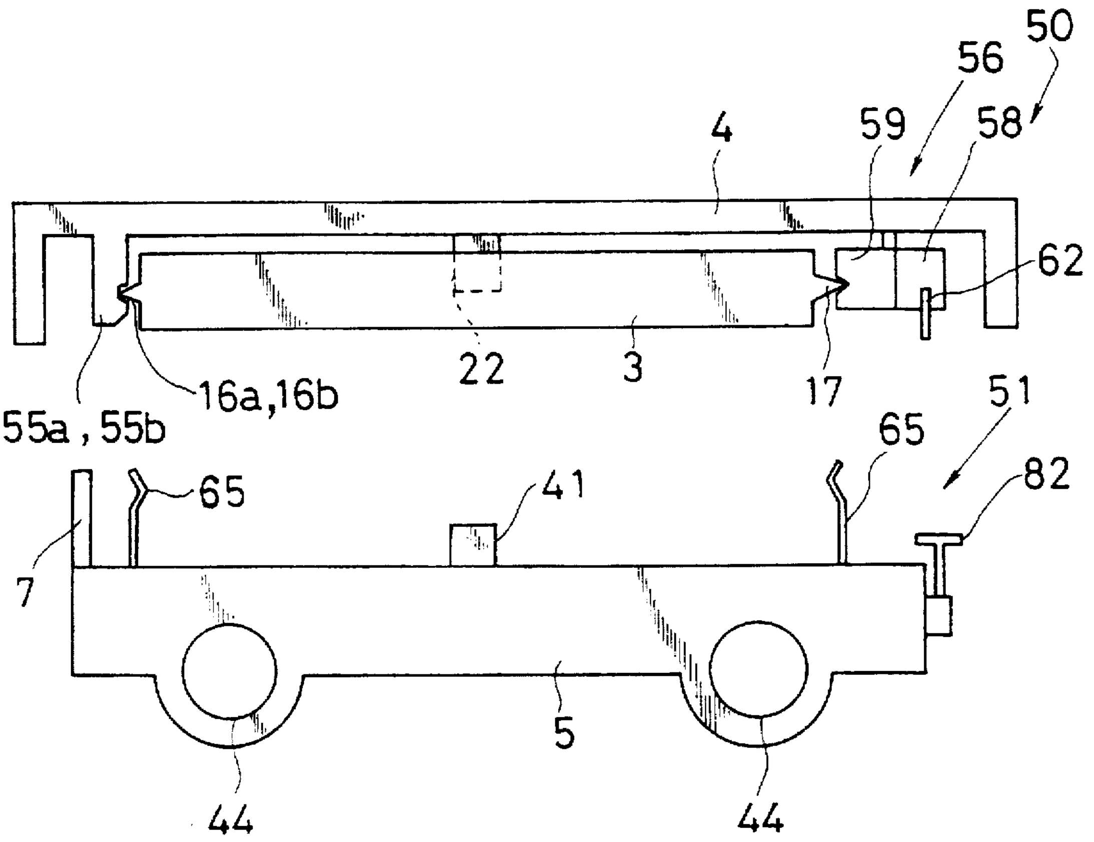
FIG. 9 is a side view showing the carriage and the cassette holder holding the ribbon cassette at the waiting position in the embodiment.
Figure 10:
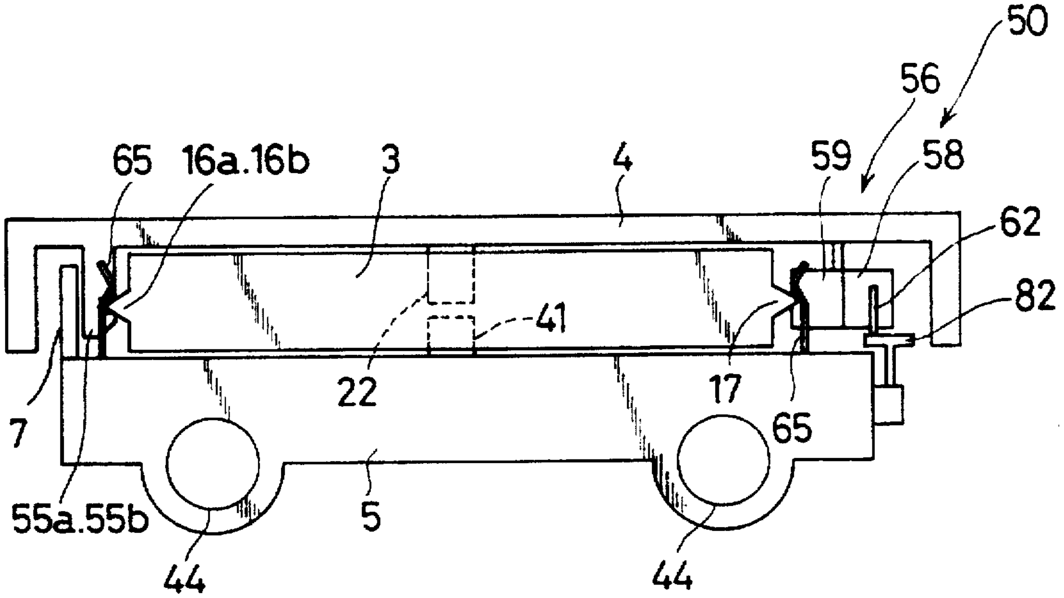
FIG. 10 is a side view showing the cassette holder and the carriage in the delivering position in the embodiment.
Figure 11:
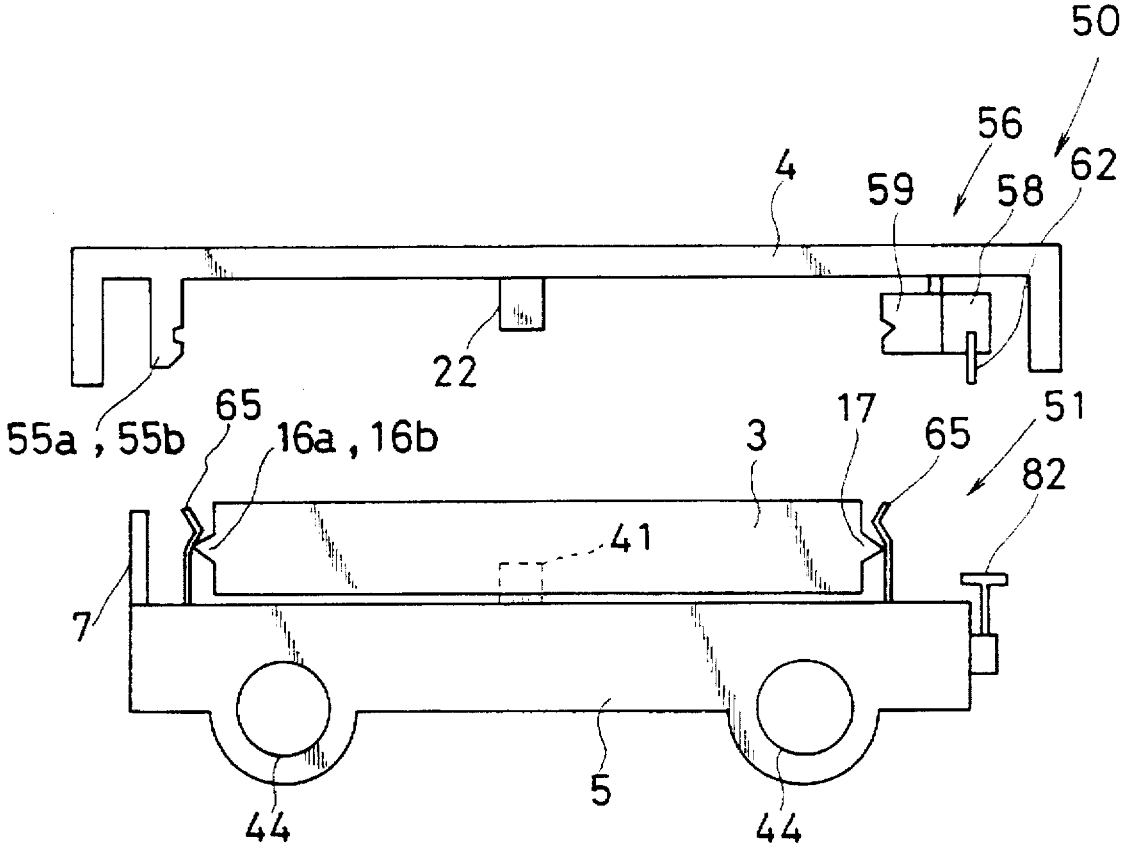
FIG. 11 is a side view showing the cassette holder and the carriage holding the ribbon cassette in the waiting position in the embodiment.
Figure 12:
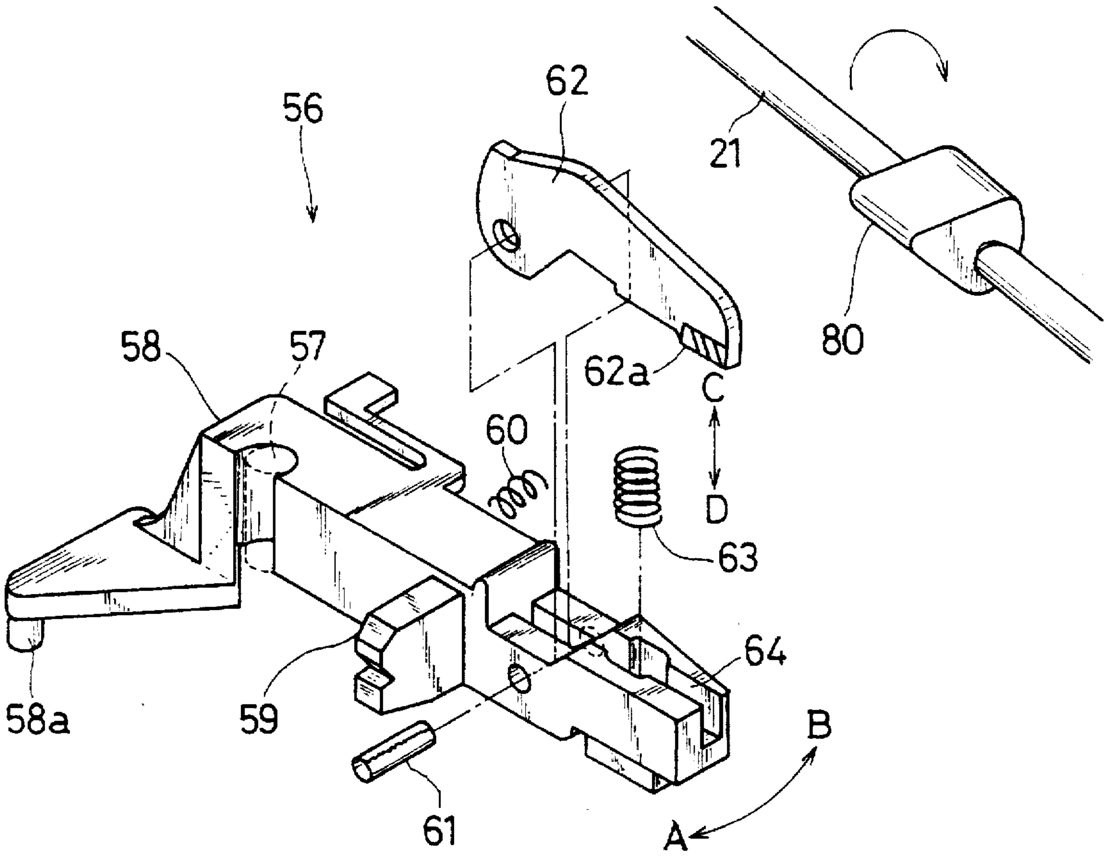
FIG. 12 is an exploded perspective view of a movable engaging portion of the embodiment.

As shown in FIGS. 9–11, the cassette mounting mechanism 51 consists of three elastic engaging pieces (elastic holding members) 65 to engage the engaging nails 16*a*, 16*b* and 17 of the ribbon cassette 3. Each engaging piece 65 is erected from the cassette mounting plate 40, and its top portion is bent to assume an angle bracket shape. The engaging pieces 65 and the fixed engaging portions 55*a* and 55*b* and the engaging body 59 are deviated from each other so that they are arranged without contact, i.e., they engage the engaging nails 16*a*, 16*b* and 17 of the ribbon cassette 3 at the same time when the cassette holder goes down to the state that both of the cassette holding mechanism 50 and the cassette mounting mechanism 51 hold the ribbon cassette 3 at the same time (see FIG. 10).

Figure 14:
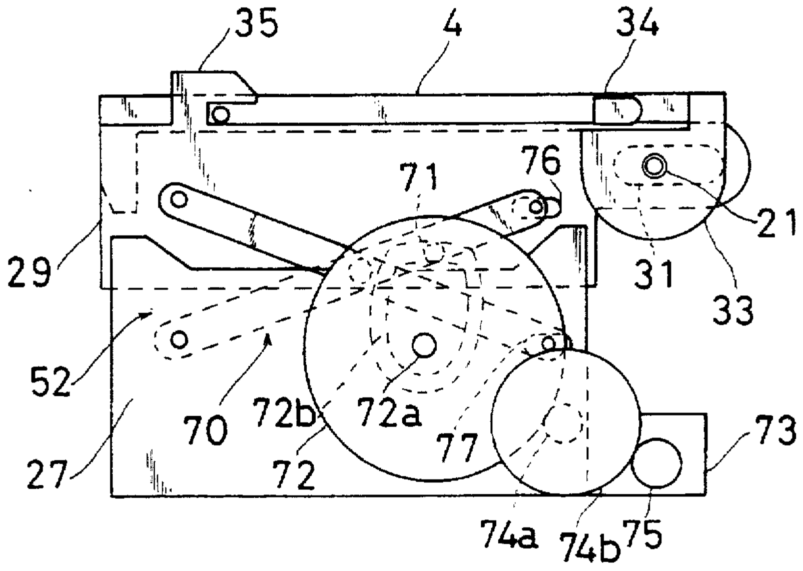
FIG. 14 shows a configuration of a vertical movement mechanism of the embodiment.
Figure 15:
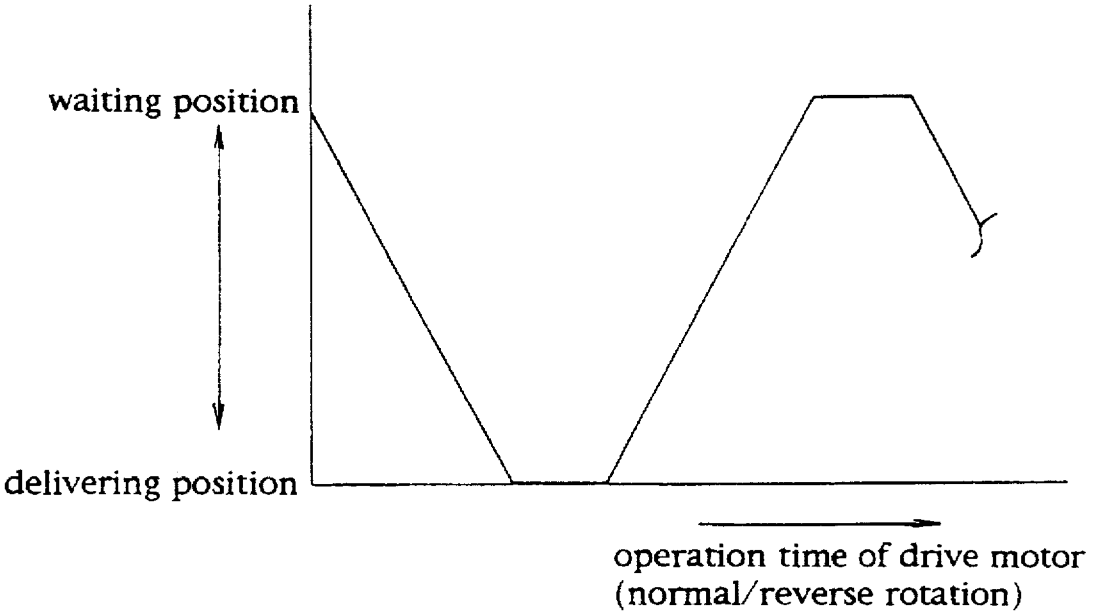
FIG. 15 shows a relationship between the operation time of a drive motor and a vertical position of the cassette holder in the embodiment.

As shown in FIG. 14, the vertical movement mechanism (first mechanism) 52 serves to move the cassette holder 4 vertically between the waiting position and the delivering position. The vertical movement mechanism 52 is composed of left and right links 70 provided between the left and right side walls 27 and 28 and the plates 29 and 30, left and right gears 72 that are held by the left and right side walls 27 and 28 so as to be rotatable about shafts 72*a* and formed with guide grooves 72*b* for guiding protrusions 71 formed on the links 70, and a reverse-rotatable drive motor (power source) 73 for driving the left-hand gear 72. In FIG. 14, reference symbols 74*a*, 74*b* and 75 denote drive force transmission gears, in which the gears 74*a* and 74*b* are unified with each other. Elongated holes 76 are formed in the plates 29 and 30 and elongated holes 77 are formed in the left and right side walls 27 and 28, and guide one ends of the links 70 in the front-rear direction. The left and right links 70 operate in link motion being coupled with shafts and gears. When the drive motor 73 operates, rotation of the gear 72 causes the protrusion 71 to move along the guide groove 72*b* to thereby move the links 70. As a result, the plates 29 and 30 are moved vertically along the left and right side walls 27 and 28, and the cassette holder 3 is also moved vertically. As shown in FIG. 15, the guide groove 72*b* of the gear 72 is so shaped as to stop the cassette holder 4 for a certain period at each of the waiting position and the delivering position. The speed of the vertical movement of the cassette holder 4 caused by the vertical movement mechanism 52 is set as fast as 400 mm/sec.

As shown in FIGS. 5, 9, 12 and 16, the linked motion mechanism (second mechanism) 53 is composed of four switching levers 80 that are provided for the latches 62 of the movable engaging portions 56 of the respective cassette holding mechanisms 50, and a drive force transmitting portion 81 that is connected to the drive motor 73 of the vertical movement mechanism 52 and rotates the switching lever 80 to bring it into abutment with the latch 62 when the cassette holder 4 is located close to the delivering position. The abutment of the switching lever 80 against the latch 62 enables rotation of the movable body 58.

Figure 24:
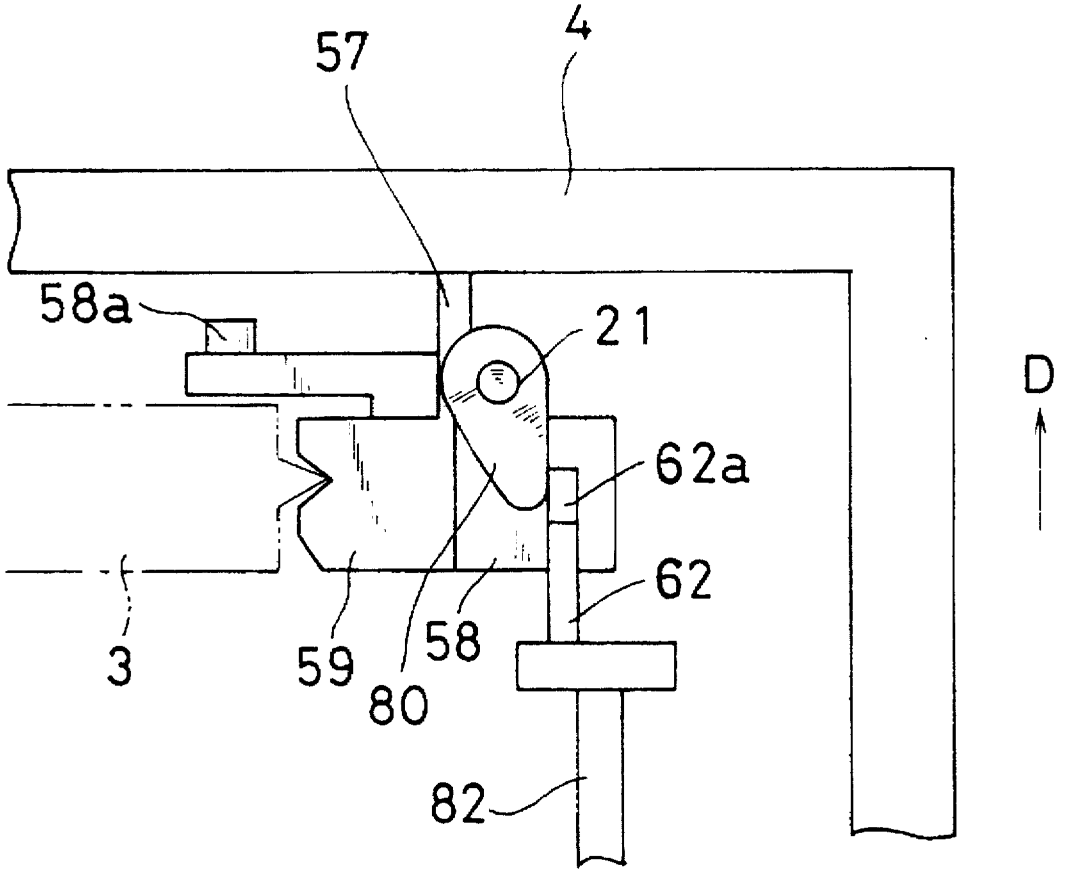
FIG. 24 shows details of the main part of FIG. 10.

The switching levers 80 are generally triangular, and fixed to the rotary shaft 21 of the cassette holder 4 at regular intervals as shown in FIG. 5. As shown in FIG. 24, the switching levers 80 are provided in front of the latch 62 (i.e., between the mounted ribbon cassette 3 and the latch 62). The switching lever 80 is so positioned as to be able to abut an end portion 62*a* of the latch 62 when the latch 62 is moved in direction D (see FIG. 12) against the urging force of the spring 63. As shown in FIGS. 9–11 and 24, the carriage 5 is provided with a selection lever 82 that abuts only the latch 62 located above the carriage 5 to move the latch 62 in direction D when the cassette holder 4 is located close to the delivering position. As a result, only the latch 62 located above the carriage 5 is allowed to abut the switching lever 80. In this manner, a cassette holding mechanism 50 whose form should be changed is selected, i.e., a ribbon cassette 3 to be delivered is selected in accordance with the position of the carriage 5.

The selection lever 82 is movable in the vertical direction and urged upward by a spring (not shown). Therefore, the selection lever 82 and the latch 62 can abut each other not only while the cassette holder 4 is at the delivering position but also for a certain period before and after it is located at the delivering position.

Figure 16:
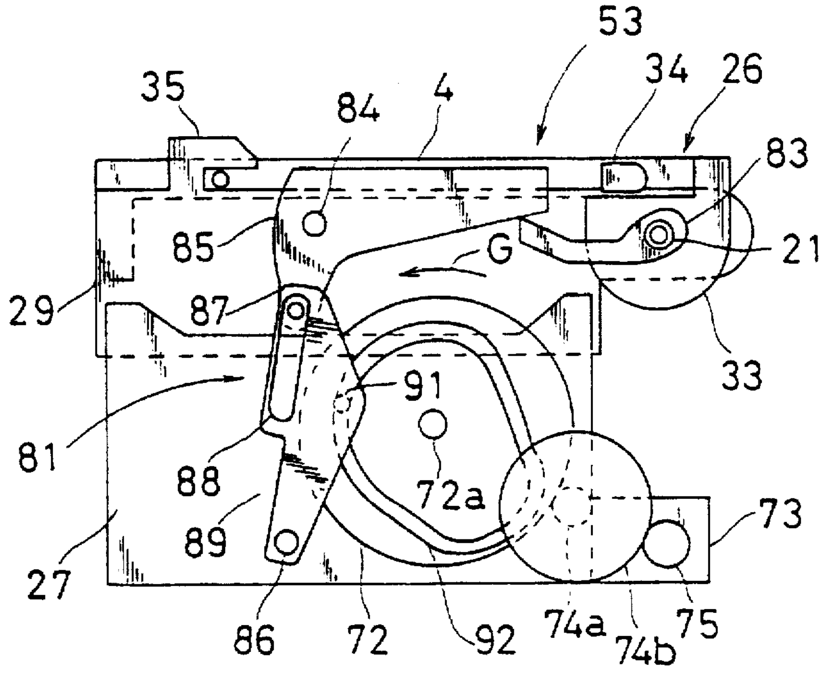
FIG. 16 shows a configuration of a linked motion mechanism.

As shown in FIG. 16, the drive force transmitting portion 81 is composed of a rotary nail 83 that is fixed to a left-hand end portion of the rotary shaft 21 to which the switching levers 80 are fixed, a first swing arm 85 which is supported by the left-hand plate 29 so as to be rotatable about a shaft 84 and one end of which is in abutment with the rotary nail 83, a second swing 89 that is supported by the left-hand side wall 27 so as to be rotatable about a shaft 86 and has an elongated hole 88 for vertically guiding a protrusion 87 formed at the other end portion of the first swing arm 85, and the left-hand gear 72 of the vertical movement mechanism 52 having a guide groove 92 for guiding a horizontal shaft 91 that is fixed to the second swing arm 89. As described above, the gear 72 is connected to the drive motor 73 of the vertical movement mechanism 52 via the drive force transmission gears 74*a*, 74*b* and 75. In the left-hand gear 72, the inside surface is formed with the guide groove 72*b* of the vertical movement mechanism 52 and the outside surface is formed with the guide groove 92. When the drive motor 73 operates to rotate the gear 72 to thereby move, in the front-rear direction, the horizontal shaft 91 of the second swing arm 89 that is guided by the guide groove 92, the first swing arm 85 is swung in association with swinging of the second swing arm 89 and one end of the first swing arm 85 rotates the rotary nail 83, to thereby rotate the switching lever 80 together with the rotary shaft 21.

Figure 17:
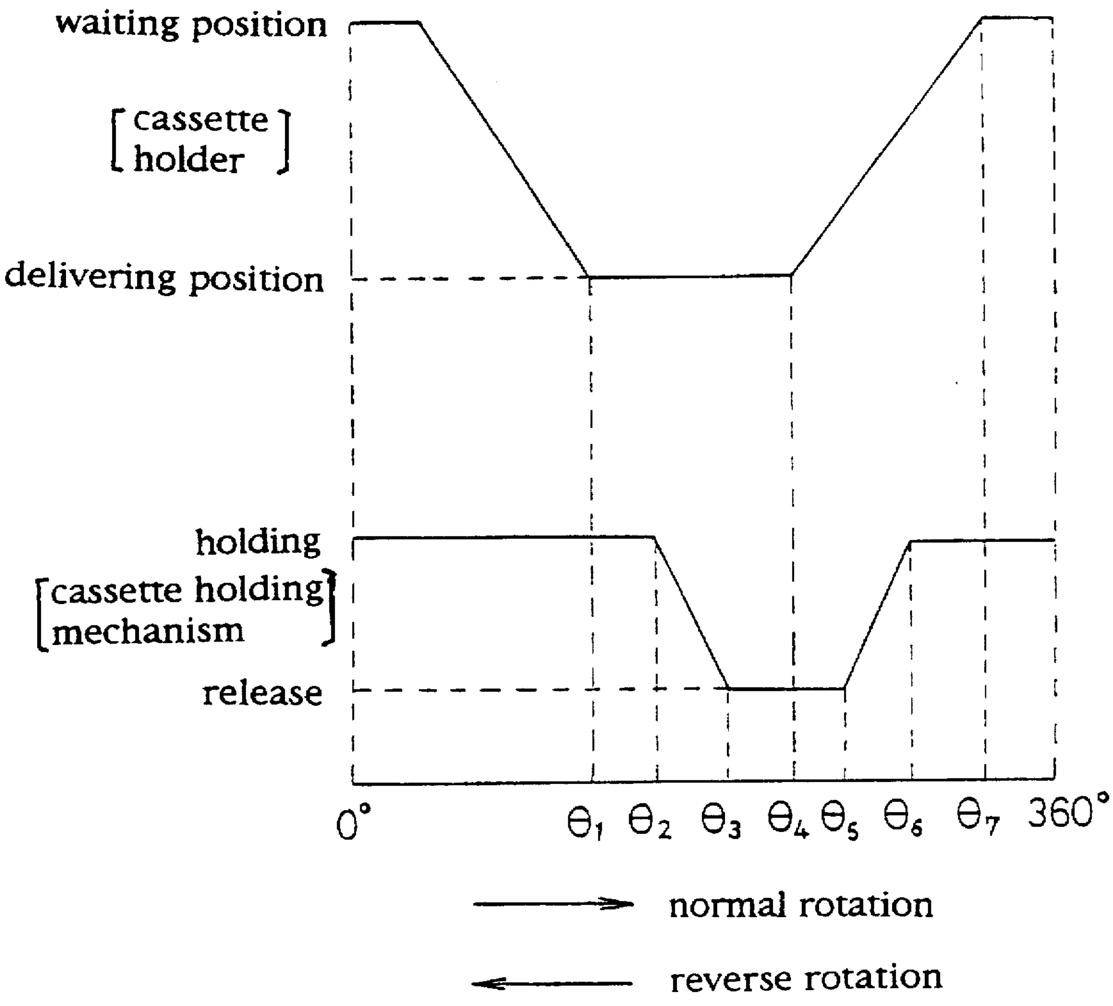
FIG. 17 shows a relationship between the operation of a switching lever and the vertical position of the cassette holder when the drive motor is rotated in the normal or reverse direction in the embodiment.

As the gear 72 is rotated from a reference position (0°) in the normal direction as indicated by arrow G in FIG. 16, the cassette holder 4 reaches the delivering position when the gear 72 is rotated to $\theta_1$, the switching lever 80 starts to rotate when the gear 72 is rotated to $\theta_2$, and the cassette holding mechanism 50 completely assumes the released form when the gear 72 is rotated to $\theta_3$ (see FIG. 17). At $\theta_4$, the cassette holder 4 starts to move upward from the delivering position, and keeps the same state (i.e., the cassette holding mechanism 50 keeps the released form) without causing rotation of the lever 80. As soon as the cassette holder 4 is thereafter returned to the waiting position, the cassette holding mechanism 50 assumes the holding form. On the other hand, as the drive motor 73 rotates in the reverse direction, the cassette holder 4 starts to move toward the delivering position when the gear 72 is rotated to $\theta_7$ (from the reference position of 360°), the switching lever 80 starts to rotate at $\theta_6$ before the cassette holder 4 reaches the delivering position, i.e., between $\theta_7$ and $\theta_4$, the cassette holder 4 completely assumes the holding form at $\theta_2$, i.e., between $\theta_4$ at which the cassette holder 4 reaches the delivering position and $\theta_1$ at which it starts to go up, and thereafter the holding form is maintained. The guide groove 92 of the gear 72 is so shaped that the switching lever 80 operates in the above manner. Therefore, the ribbon cassette 3 can be moved from the cassette holder 4 to the carriage 5 by the normal rotation of the drive motor 73, and can be returned from the carriage 5 to the cassette holder 4 by the reverse rotation of the drive motor 73.

Figure 18:
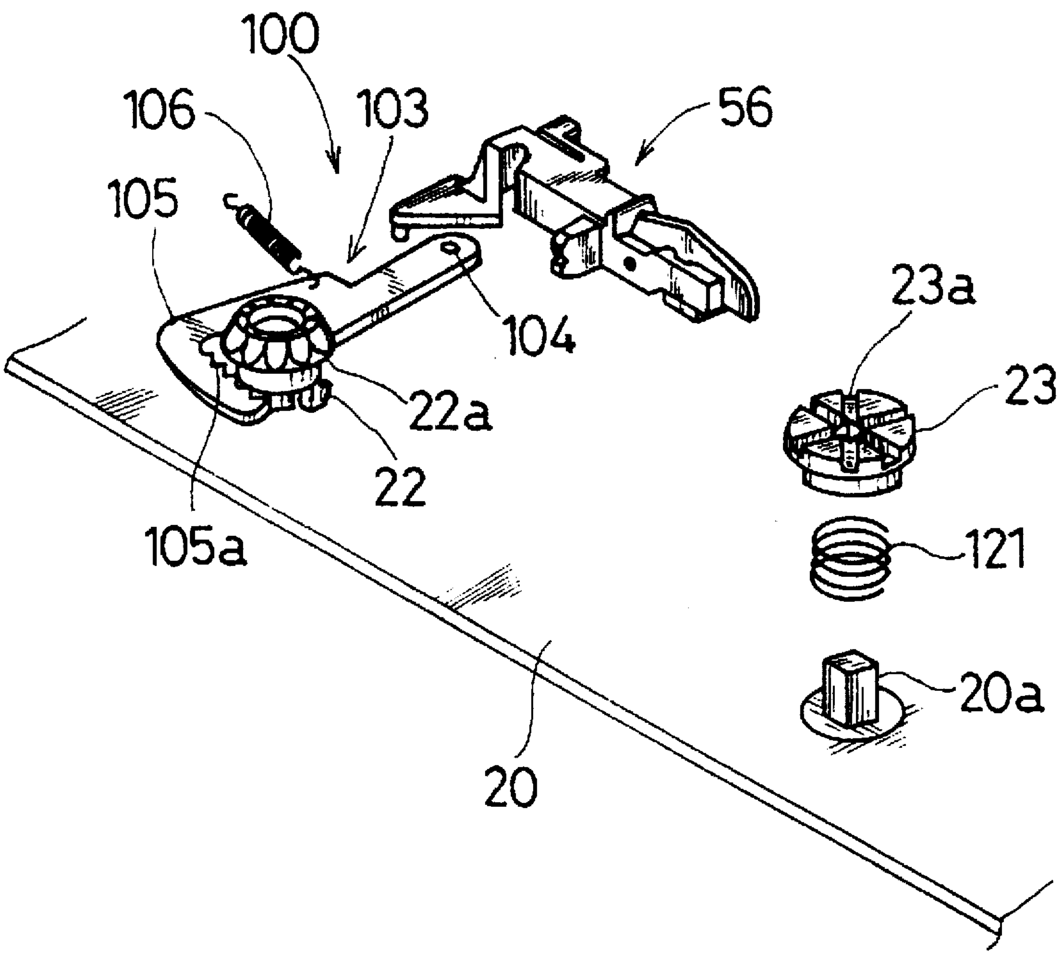
FIG. 18 is a perspective view showing a ribbon take-up body and a rotation preventing body of the embodiment.

It may occur a situation that the ink ribbon 10 of the ribbon cassette 3 that is mounted on the carriage 5 is loosened by, for instance, vibration during a printing operation. If the ribbon cassette 3 containing the loose ink ribbon 10 is returned to the cassette holder 4, or if the ribbon cassette 3 containing the loose ink ribbon 10 is again mounted on the carriage 5, the ink ribbon may be entangled. A description will be made of a tightening mechanism 100 for removing loosening of the ribbon cassette 3 when it is returned from the carriage 5 to the cassette holder 4. As shown in FIGS. 5 and 18, the tightening mechanism 100 has the rotatable ribbon take-up body 22 provided in each cassette mounting portion 20 of the cassette holder 4, the rotation preventing body 23 for preventing rotation of the ribbon supply core 11 of the ribbon cassette 3, and a rotation operating body 103 for rotating the ribbon take-up body 22 in the ribbon take-up direction.

A plurality of engaging grooves 22*a* to engage the engaging protrusions 12*a* of the ribbon take-up core 12 are formed in the ribbon take-up body 22 at regular intervals. A plurality of engaging grooves 23*a* to engage the engaging protrusions 11*a* of the ribbon supply core 11 are formed in the rotation preventing body 23 at regular intervals. As shown in FIG. 18, fitted with a prism-like shaft 20*a* that is erected from the cassette mounting portion 20, the rotation preventing body 23 is fixed to the cassette mounting portion 20. Alternatively, the rotation preventing body 23 may be made of sponge, rubber, or the like which can prevent rotation of the ribbon supply core 12 of the ribbon cassette 3 by friction when abutting it.

Figure 19A:
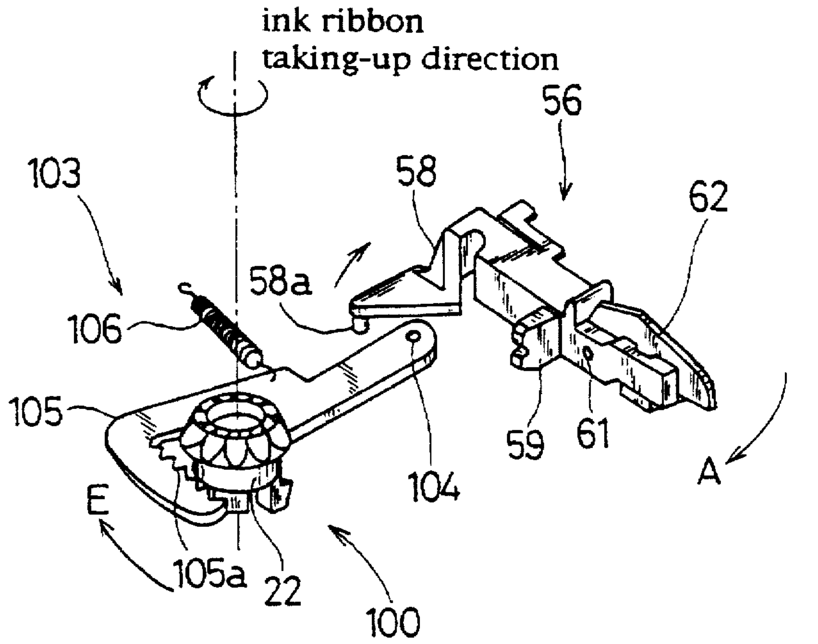
FIG. 19(*a*) is a perspective view of a tightening mechanism when the engaging body is closed in the embodiment.
Figure 19B:
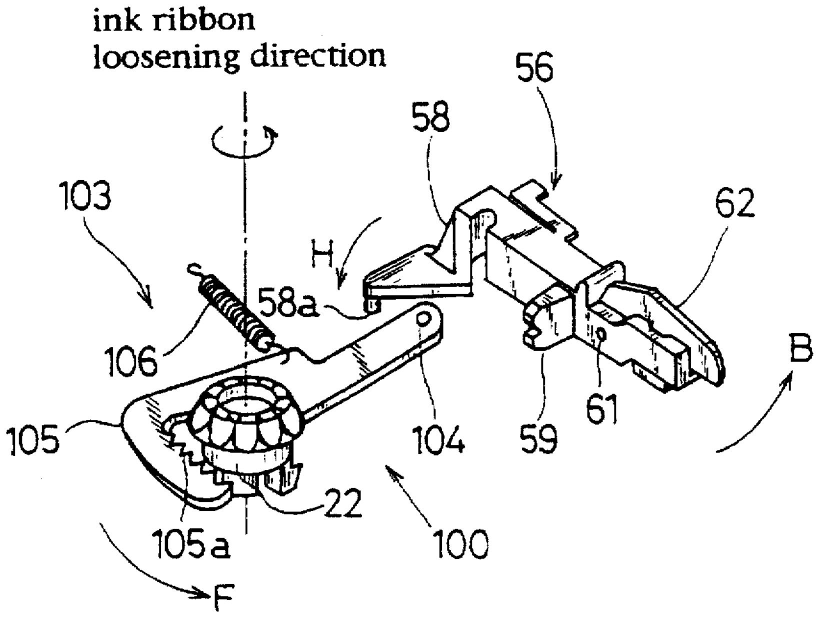

Referring to FIGS. 19(*a*) and 19(*b*), the rotation operating body 103 is composed of an L-shaped sector gear 105 that is supported by the cassette mounting portion 20 so as to be rotatable about a shaft 104 and has at a tip portion a gear portion 105*a* engaging with a gear portion of the ribbon take-up body 22, and a spring 106 that is provided between the sector gear 105 and the cassette mounting portion 20 and urges the sector gear 105 in direction E (i.e., in the direction of taking up the ink ribbon 10). When the cassette holding mechanism 50 is rendered into the released form, the movable body 58 is rotated is rotated (released) in direction B and a protrusion 58*a* projecting from an end portion of the movable body 58 is moved in direction H, to abut the sector gear 105. As a result, the sector gear 105 is rotated in direction F (i.e., in the direction of loosening the ink ribbon 10).

With the above structure, in an operation of returning the ribbon cassette 3 from the carriage 5 to the cassette holder 4, the cassette holding mechanism 50 is rendered into the released form while the cassette holder 4 goes down. In this operation, energy (force of rotating the ribbon take-up body 23 in the direction of taking up the ink ribbon 10) is stored in the spring 106 that is connected to the sector gear 105 by the power of opening the engaging body 59. When the cassette holder 4 reaches the delivering position, the sector gear 105 is returned by the energy stored in the spring 106 upon switching of the cassette holding mechanism 50 to the holding form, and the ribbon take-up body 22 is rotated in the direction of taking-up the ink-ribbon 10. However, at this time, since the ribbon take-up shaft 41 of the carriage 5 is engaged with the ribbon take-up core 12 of the ribbon cassette 3, the ribbon take-up body 22 may rotate without any load.

To avoid this problem, as shown in FIG. 20, recesses 22*b* and protrusions 41*b* that are engaged with each other when the cassette holder 4 is at the delivering position are formed in the ribbon take-up body 22 and the ribbon take-up shaft 41, respectively. By virtue of this structure, even if the cassette holding mechanism 50 is switched to the holding form to generate the force of rotating the ribbon take-up body 22 when the cassette holder 4 is at the delivering position, the ribbon take-up body 22 is not rotated because of the engagement between the ribbon take-up body 22 and the ribbon take-up shaft 41. When the cassette holder 4 is moved upward while holding the ribbon cassette 3 and the engagement between the ribbon take-up body 22 and the ribbon take-up shaft 41 is released, the ribbon take-up body 22 is rotated to positively take up the ink ribbon 10. In this operation, the ribbon take-up shaft 41 of the carriage 5 is held by a detent.

When the ribbon cassette 3 is delivered between the cassette holder 4 and the carriage 5, the protrusions of the cores 11 and 12 of the ribbon cassette 3 and those of the ribbon take-up body 22 and the rotation preventing body 23 of the cassette holder 4 may collide with each other, or the protrusions of the cores 11 and 12 of the ribbon cassette 3 and those of the ribbon take-up shaft 41 and the ribbon supply shaft 42 of the carriage may collide with each other. That is, they do not engage with each other, to cause a problem in the delivery of the ribbon cassette 3. In the case of a structure in which the ribbon cassette 3 is delivered by hand, this problem can be solved by re-mounting or manual adjustment. However, in a structure in which the ribbon cassette 3 is delivered automatically, this directly leads to an erroneous operation.

To solve this problem, the following structure is employed. The ribbon take-up body 22 and the rotation preventing body 23 of the cassette holder 4 and the ribbon take-up shaft 41 and the ribbon supply shaft 42 of the carriage 5 are so disposed as to be movable in the vertical direction. A spring 120 for urging the ribbon take-up body 22 in the direction of engaging it with the ribbon take-up core 12 is interposed between the ribbon take-up body 22 and the cassette mounting portion 20. A spring 121 for urging the rotation preventing body 23 in the direction of engaging it with the ribbon supply core 11 is interposed between the rotation preventing body 23 and the cassette mounting portion 20. A spring 122 for urging the ribbon take-up shaft 41 in the direction of engaging it with the ribbon take-up core 12 is interposed between the ribbon take-up shaft 41 and the cassette mounting plate 40. A spring (not shown) for urging the ribbon supply shaft 42 in the direction of urging it with the ribbon supply core 11 is interposed between the ribbon supply shaft 42 and the cassette mounting plate 40. With this structure, when the protrusions collide with each other, the members on the side of the cassette holder 4 and the members on the side of the carriage 5 are moved (escaped) in the vertical direction, to thereby avoid the problem that the delivery of the ribbon cassette 3 is obstructed. Further, when the ribbon take-up body 22 is rotated for tightening on the side of the cassette holder 4, and when the ribbon take-up shaft 41 is rotated for printing on the side of the carriage 5, the phases of the protrusions are deviated from each other to cause the protrusions to engage the grooves, to thereby allow engagement with the cores 11 and 12 of the ribbon cassette 3.

Figure 21:
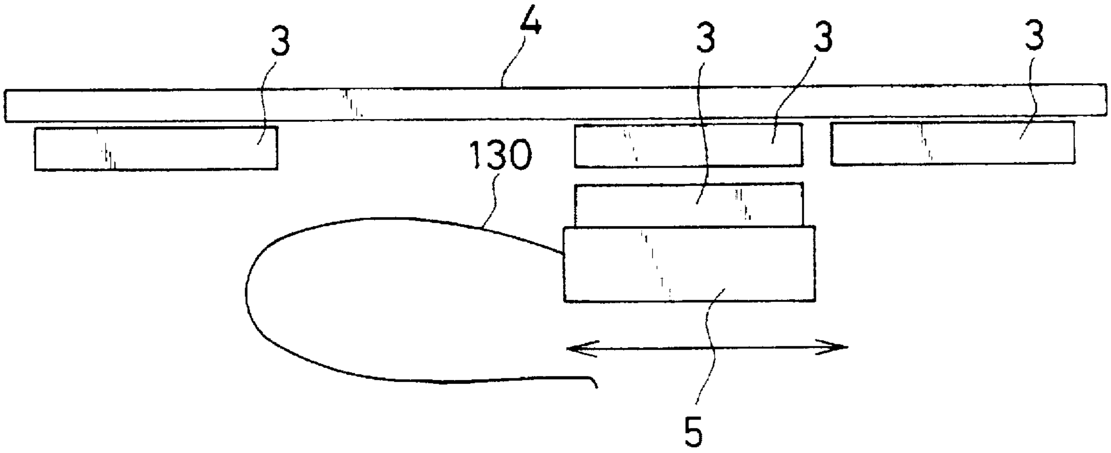
FIG. 21(*a*) shows a relationship between a ribbon cassette lacking portion of the cassette holder and a cable of the carriage in the embodiment.
Figure 21:
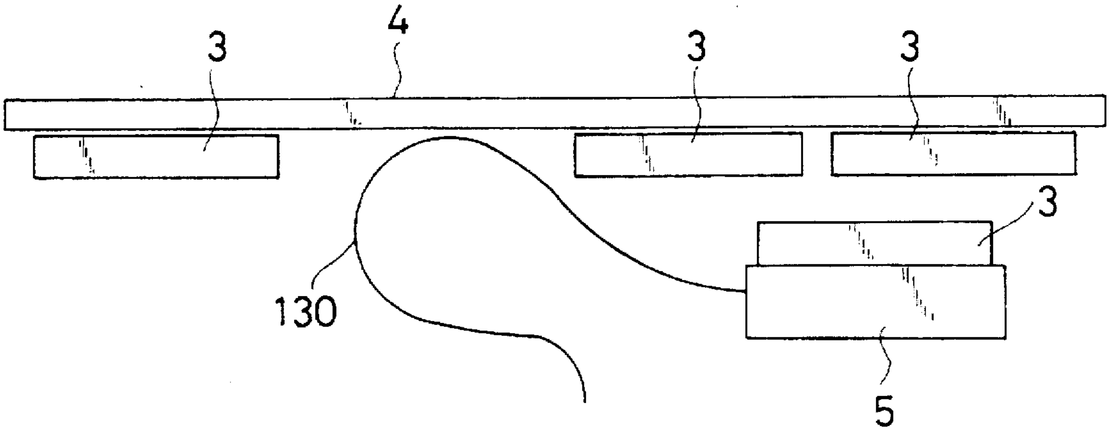

On the other hand, when the ribbon cassette 3 is mounted from the cassette holder 4 to the carriage 5, there occurs a ribbon cassette lacking portion in the cassette holder 4 as shown in FIG. 21(*a*), and a step appears on the surface of the cassette holder 4 when viewed from the carriage 5. In this case, as shown in FIG. 21(*b*), a band-like flexible wiring member (cable) 130 for supplying electric signals to the carriage 5 may enter the step and may be hooked by the cassette holding mechanism 50 or parts of some other mechanism on the side of the cassette holder 4. This may cause breaking of the cable 130 or damage parts of a mechanism.

Figure 22A:
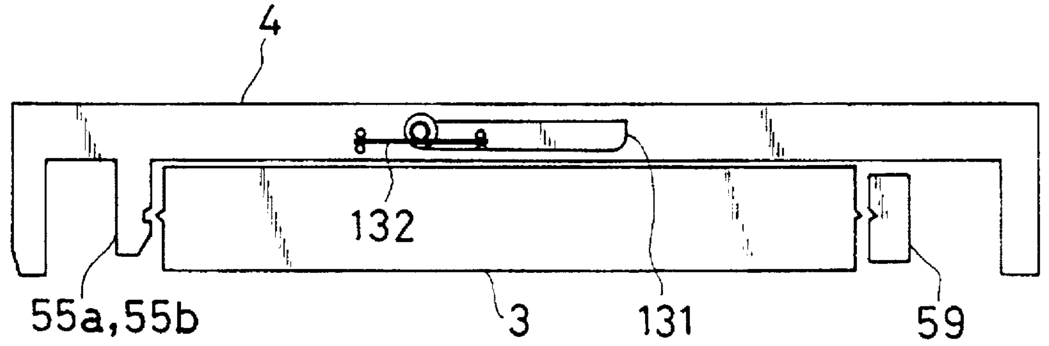
FIG. 22(*a*) shows a state that a projecting member is incorporated in the cassette holder in the embodiment.
Figure 22B:
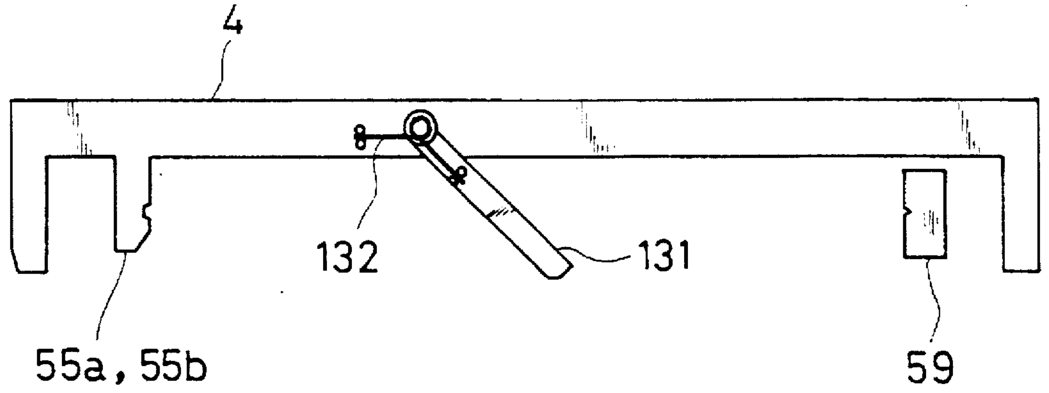

To solve this problem, as shown in FIGS. 22(*a*) and 22(*b*), a plurality of projecting members 131 are provided that project toward the mounting portion of each ribbon cassette 3 of the cassette holder 4. The projecting member 131 is rotatably supported by the cassette mounting portion 20 of the cassette 4 and urged in the direction of projecting toward the mounting portion of the ribbon cassette 3 by a helical torsion spring 132 provided between the projecting member 131 and the cassette mounting portion 20. With this structure, when the ribbon cassette 3 is mounted on the cassette holder 4, the projecting member 131 is incorporated in the cassette holder 4 being pushed by the ribbon cassette 3. When the ribbon cassette 3 is not mounted on the cassette holder 4 (i.e., it is mounted on the carriage 5), the projecting member 131 is projected by the urging force of the helical torsion spring 132 to such an extent as to almost cancel the step of the cassette holder 4 caused by the absence of the ribbon cassette 3. Instead of using the helical torsion spring 132, there may be employed a structure in which the projecting member 131 projects by its own weight when the ribbon cassette 3 is not mounted.

Further, the thermal printer of this embodiment is provided with a cassette existence sensor for detecting the existence of each ribbon cassette 3 on the cassette holder 4, an open/close sensor for detecting opening/closing of the cassette holder 4, a home position sensor for detecting the home position of the carriage 5, and other sensors. Also provided is a microcomputer for executing a printing operation based on outputs of the respective sensors and recording information (printing information).

The microcomputer has a function of causing the recording head 7 to abut the platen 6 through the recording sheet K and the ink ribbon 10 while the carriage is moved in the printing operation, and separating the recording head 7 from the platen 6 while the carriage 5 is moved in the carriage returning operation and the ribbon cassette delivering operation, a function of rotating the drive motor 73 in the normal direction in mounting the ribbon cassette 3 from the cassette holder 4 to the carriage 5, and a function of rotating the drive motor 73 in the reverse direction in returning the ribbon cassette 3 from the carriage 5 to the cassette holder 4.

With the above configuration, the cassette holder 4 is opened to the mounting position and the ribbon cassettes 3 are mounted on the respective cassette mounting portions 20 in the order of Y, M, C and B from the left side. In this operation, the engaging nails 16*a* and 16*b* of the ribbon cassette 3 engage the fixed engaging portions 55*a* and 55*b* of the cassette holder 4, the engaging nail 17 of the ribbon cassette 3 engages the engaging body 59 of the cassette holder 4, the ribbon supply core 11 of the ribbon cassette 3 engages the rotation preventing body 23 of the cassette holder 4, and the ribbon take-up core 12 of the ribbon cassette 3 engages the ribbon take-up body 22 of the cassette holder 4. After the cassette holder 4 holding the ribbon cassette 3 is rotated by 180° about the rotary shaft 21 of the cassette holder 4 and is thereby closed completely, the cassette holder 4 is moved backward in the horizontal direction by the spring 32 of the cassette holder 4 and placed at the waiting position. Since the cassette holder 4 is rotated at the position distant from the recording sheet K, it does not contact with the recording sheet K.

If a color printing operation is started in this state, the carriage is moved so as to be located under the ribbon cassette 3 of a color (for instance, Y) specified by printing information. In this operation, the carriage 5 moves at high speed because the recording head 7 of the carriage 5 is not in abutment with the platen 6. When it is detected based on the output of the home position sensor indicating a movement distance from the home position that the carriage 5 has reached the position under the ribbon cassette 3 of Y, the drive motor 73 is rotated in the normal direction to cause the vertical movement mechanism 52 to move the cassette holder 4 downward from the waiting position to the delivering position.

As a result, as shown in FIG. 10, the respective engaging pieces 65 of the carriage 5 engage the engaging nails 16*a*, 16*b* and 17 of the ribbon cassette 3. Further, as shown in FIG. 20, the ribbon supply shaft 42 of the carriage 5 engages the ribbon supply core 11 of the ribbon cassette 3, and the ribbon take-up shaft 41 of the carriage 5 engages the ribbon take-up core 12 of the ribbon cassette 3. Even in the event that the protrusions of the ribbon take-up shaft 41 and the ribbon take-up core 12 collide with each other to prevent proper engagement between the shaft 41 and the core 12, the ribbon take-up shaft 41 escapes downward against the urging force of the spring 122, to avoid the problem that the mounting of the ribbon cassette 3 is obstructed.

In the cassette holding mechanism 50 over the carriage 5, the latch 62 is pushed up by the selection lever 82 of the carriage 5 and the switching lever 80 of the linked motion mechanism 53 is capable of abutting the latch 62. In the other cassette holding mechanisms 50, since the latch 62 is located below, the switching lever 80 operates only to fail to abut the latch 62. In the cassette holding mechanism 50 over the carriage 5, the rotation of the rotary shaft 21 causes the switching lever 80 to abut the latch 62 to thereby push the movable body 58 forward, so that the engaging body 59 of the cassette holding mechanism 50 is opened and the form of the cassette holding mechanism is changed from the holding form to the released form. In this operation, the cassette holder 4 is moved backward by an amount corresponding to its play, so that the engagement between the fixed engaging portions 55*a* and 55*b* of the cassette holder 4 and the engaging nails 16*a* and 16*b* of the ribbon cassette 3 is released.

On the other hand, as shown in FIG. 19(*b*), when the engaging body 59 is opened (i.e., moved in direction B), the sector gear 105 is rotated in direction F and the ribbon take-up body 22 is rotated in the direction of loosening the ink ribbon 10. Thus, the ink ribbon 10 of the ribbon cassette 3 is loosened. However, at this time, since the ribbon cassette 3 has already been mounted on the carriage 5, the ink ribbon 10 is never hooked by the recording head 7 etc.

As the cassette holder 4 goes up, it is removed from the ribbon cassette 3 and the cassette holding mechanism assumes the holding form. Thus, the cassette holder 4 is returned to the waiting position. In this operation, as shown in FIG. 22(*b*), the projecting member 141 is projected to the portion of the cassette holder 4 which was occupied by the ribbon cassette 3 of Y. As a result, there appears no step in the surface of the cassette holder 4 when viewed from the carriage 5, to avoid the problem that the cable 130 is hooked by, for instance, parts of a mechanism on the side of the cassette holder 4 during movement of the carriage 5.

The carriage 5 that is carrying the ribbon cassette 3 of Y is returned to the home position at high speed, the recording head 7 is brought into abutment with the platen 6 through the recording sheet K and the ink ribbon 10, and then the carriage 5 is moved parallel with the platen 6 while the ink ribbon 10 is taken up. Thus, an image of Y is formed on the recording sheet K. Where the protrusions of the ribbon take-up shaft 41 of the carriage 5 and those of the ribbon take-up core 12 of the ribbon cassette 3 collide with each other and the ribbon take-up shaft 41 is escaped downward, upon slight rotation of the ribbon take-up shaft 41 by the printing operation a phase relationship between the protrusions is changed and the ribbon take-up shaft 41 and the ribbon take-up core 12 are engaged with each other.

To replace the currently used ribbon cassette 3 of Y with a ribbon cassette 3 of another color (for instance, M), first the ribbon cassette 3 of Y needs to be returned to the cassette holder 4. Therefore, the carriage 5 is again moved to the position under the cassette mounting position 20 of the cassette holder 4 where the ribbon cassette 3 of Y was mounted. At this time, the drive motor 73 is rotated in the reverse direction to move the cassette holder 4 downward. As the cassette holder 4 goes down, the switching lever 80 is rotated to switch the cassette holding mechanism 50 to the released form. In this operation, the ribbon take-up body 22 of the cassette holder 4 is rotated in the direction of loosening the ink ribbon 10, so that energy for rotating the ribbon take-up body 22 in the direction of taking up the ink ribbon 10 is stored in the spring 106. The latch 62 is in abutment with the selection lever 82.

When the cassette holder 4 has reached the delivering position, the cassette holding mechanism 50 is switched to the holding form, and holds the ribbon cassette 3 over the carriage 5. The ribbon take-up body 22 engages the ribbon take-up core 12 of the ribbon cassette 3, and the rotation preventing body 23 engages the ribbon supply core 11 of the ribbon cassette 3. If the protrusions of the ribbon take-up body 22 and the ribbon take-up core 12 collide with each other, or the protrusions of the rotation preventing body 23 and the ribbon supply core 11 collide with each other to disable proper engagement, the ribbon take-up body 22 or the rotation preventing body 23 escapes upward against the urging force of the spring 120 or 121. Thus, there can be avoided the problem that the mounting of the ribbon cassette 3 is obstructed. Further, as shown in FIG. 19(*a*), when the engaging body 59 is closed in direction A, the sector gear 105 tends to return in direction E. However, the ribbon take-up body 22 does not rotate because the ribbon take-up body 22 of the cassette holder 4 is engaged with the ribbon take-up shaft 41 of the carriage 5.

Subsequently, as the cassette holder 4 goes up, the ribbon cassette 3 held by the cassette holder 4 moves upward while elastically deforming the engaging pieces 65 of the carriage 5. Thus; the ribbon cassette 3 is separated from the carriage 5 and the cassette holder 4 that is holding the ribbon cassette 3 is returned to the waiting position. Further, the engagement between the ribbon take-up body 22 of the cassette holder 4 and the ribbon take-up shaft 41 of the carriage 5 is released, the sector gear 105 is rotated in direction E by the energy stored in the spring 106, and the ribbon take-up body 22 is rotated in the direction of taking up the ink ribbon 10. In this operation, since the rotation preventing body 23 is fixed, i.e., does not rotate, the ink ribbon 10 can be tightened. Where the ribbon take-up body 22 or the rotation preventing body 23 has escaped upward, a phase relationship between the protrusions is changed and engagement is established when the ribbon take-up body 22 is slightly rotated by the tightening operation.

The carriage 5 from which the ribbon cassette 3 has been removed is moved to the position under the ribbon cassette 3 of M that should be mounted next on the carriage 5. Then, the ribbon cassette of M is mounted on the carriage 5 by the operation similar to the above. And an image of M is formed on the same line on the recording sheet K as the image of Y was formed. Further, an image of C is formed on the same line in the similar manner. After completion of all the operations of recording the images of Y, M and C, a sheet feeding device 8 performs line feed on the recording sheet K. A color printing operation for one sheet is completed by successively forming images of Y, M and C. Where printing is performed by use of B or a single color, the single ribbon cassette 3 is used to the end of operation without replacing the ribbon cassette 3. As an alternative operation, after images of Y, M and C are formed and then line feed is effected, next images may be formed in the order of C, M and Y. In this case, the number of operations of delivering the ribbon cassette 3 can be reduced, which means shortening of the printing time. As a further alternative, there may be repeated a set of operations that a printing operation for one sheet is performed by use of one color, a recording sheet K is returned to the initial position, a printing operation for the same sheet K is performed by use of another color, and the recording sheet K is again returned to the initial position. Also in this case, the number of operations of delivering the ribbon cassette 3 can be made two or three, which means a great reduction of the printing time.

Figure 23:
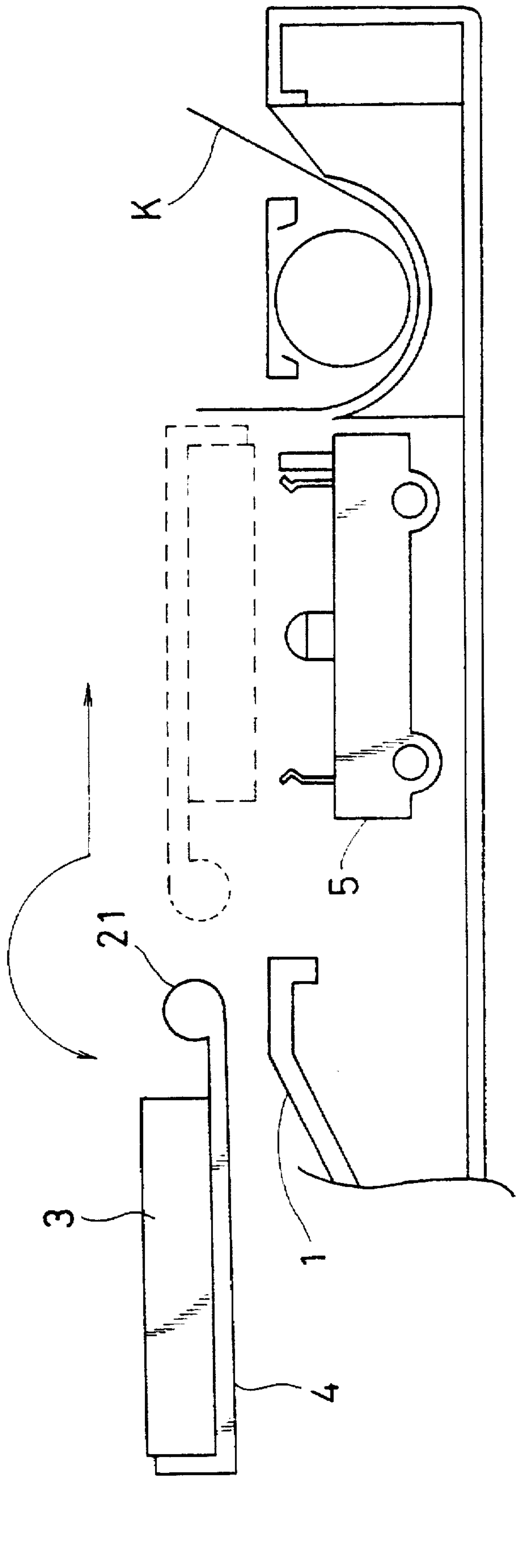
FIG. 23 shows a positional relationship between the cassette holder being opened and a case in the embodiment.

When one of the ribbon cassettes 3 comes to a life end (for example, the ink ribbon 10 is completely taken up), the cassette holder is moved forward from the waiting position and opened at the position distant from the recording sheet K. The ribbon cassette 3 is replaced with a new one in this state. In this operation, as shown in FIG. 23, the ribbon cassette 3 can be replaced easily because the cassette holder 4 is located at the top-front position of the case and the ribbon cassettes are exposed.

As described above, since the cassette holder 4 on which a plurality of ribbon cassettes 3 are arranged horizontally is opposed to the carriage 5 in the vertical direction, the device can be made thinner.

Since the holding and the delivering of the ribbon cassette is performed mechanically, the operations of holding and delivering the ribbon cassette 3 can be performed more positively than in the conventional case in which the ribbon cassettes are held magnetically. This provides advantages that the reliability is increased, and the ribbon cassettes 3 need not be made of, for instance, a magnetic material but may have the same shape as those on the market, which enables a cost decrease.

When the cassette holder 4 goes down, the selection lever 82 of the carriage 5 abuts the latch 62 of only the cassette holding mechanism 50 that is located above the carriage 5, to thereby allow switching of the form of the cassette holding mechanism 50. Therefore, a ribbon cassette 3 to be delivered can be selected based on the stopped position of the carriage 5, without the need of a special ribbon cassette selecting mechanism nor complex control.

Since the cassette holding mechanism 50 of the cassette holder 4 is composed of the fixed engaging portions 55*a* and 55*b* and the movable engaging portion 56, the ribbon cassette 3 can be removed or mounted only by causing the movable engaging portion 56 to operate. Because it is sufficient to provide the mechanism for causing the engaging portion to operate only on one side, the size of the device can be reduced from the case of causing both engaging portions to operate that are to engage the ribbon cassette 3. Further, the opening/closing structure of the cassette holding mechanism 50 can be simplified.

Since the tightening mechanism 100 can automatically tighten the ink ribbon 10 of the ribbon cassette 3, an erroneous operation can be prevented that the ink ribbon 10 is hooked by such a member as the recording head 7 when the ribbon cassette 3 is mounted on the carriage 5.

Further, the rotation preventing body 23 of the cassette holder 4 can prevent the ink ribbon 10 from moving in the taking-up direction in tightening the ink ribbon 10. Thus, the tightening of the ink ribbon 10 can be performed positively. In addition, since the ink ribbon 10 already used does not go back, there is no possibility that it is again used for printing.

Even in the event that the ribbon take-up body 22 or the rotation preventing body 23 of the cassette holder 4 does not properly engage the core 11 or 12 of the ribbon cassette 3 when the ribbon cassette 3 is mounted on the cassette holder 4, the ribbon take-up body 22 or the rotation preventing body 23 escapes against the urging force of the spring 120 or 121. Therefore, the mounting of the ribbon cassette 3 is not obstructed and an erroneous operation can be prevented. Further, in this state, if the ribbon take-up body 22 is rotated slightly to change the phase relationship, the cassette holder side and the ribbon cassette side are engaged with each other. Therefore, the mounting and engagement of the ribbon cassette 3 on and with the cassette holder 4 can be performed positively with the simple structure.

In the event that the ribbon take-up shaft 41 or the ribbon supply shaft 42 of the carriage 5 does not properly engage the core 11 or 12 of the ribbon cassette 3 when the ribbon cassette 3 is mounted on the carriage 5, the ribbon take-up shaft 41 or the ribbon supply shaft 42 escapes against the urging force of the spring 122. Therefore, the mounting of the ribbon cassette 3 is not obstructed and an erroneous operation can be prevented. Further, in this state, if the ribbon take-up shaft 41 is rotated slightly to change the phase relationship, the carriage side and the ribbon cassette side are engaged with each other. Therefore, the mounting and engagement of the ribbon cassette 3 on and with the carriage 5 can be performed positively with the simple structure.

When there occurs a ribbon cassette lacking portion in the cassette holder 4, the projecting member 131 is projected toward the portion that was occupied by a ribbon cassette 3, to thereby making the surface of the cassette holder 4 appear close to a flat surface when viewed from the carriage 5. With this structure, a problem can be avoided that the cable 130 of the carriage 5 enters the ribbon cassette lacking portion of the cassette holder 4 and is hooked by a member of that portion.

Since the cassette holder 4 can be rotated only at the position distant from the recording sheet K, a problem can be prevented that when cassette holder 4 is opened or closed, for instance, in replacing the ribbon cassette 3 after insertion of the recording sheet K, the recording sheet K is hooked by the cassette holder 4, so that the recording sheet K is broken or the cassette holder 4 cannot be closed. Further, since the ribbon cassette 3 is located above and exposed from the case 1 when the cassette holder 4 is opened, the ribbon cassette 3 can be replaced easily.

The invention is not limited to the above embodiment, but it is apparent that many modifications and alterations can be made of the embodiment without departing from the scope of the invention. For example, instead of the cassette holder 4, the carriage 5 may be moved vertically. The cassette holding mechanism 50 may be provided on the side of the carriage 5. A plural rows of ribbon cassettes 3 may be arranged on and held by the cassette holder 4 horizontally in the front-rear direction. In tightening the ink ribbon 10 of the ribbon cassette 3, the ribbon take-up core 12 may be fixed and the ribbon supply core 11 may be rotated in the direction of applying tension o the ink ribbon 10. Further, a sensor or the like for judging the color of the ink ribbon 10 may be provided and the carriage 5 may be moved to the position of a ribbon cassette to be delivered based on an output signal of the sensor or the like. In this case, it is not necessary to place a ribbon cassette 3 of a particular color at a particular position of the cassette holder 4. Therefore, the ease of operation is improved and an erroneous operation can be prevented in setting the ribbon cassettes 3 on the cassette holder 4. Further, a plurality of ribbon cassettes 3 of the same color may be mounted on the cassette holder 4 so that when the ink ribbon 10 of one ribbon cassette 3 is fully consumed, a printing operation can be continued by automatically substituting the next ribbon cassette 3. With this configuration, where the ribbon cassettes 3 of a certain color (for instance, B) are used at a high frequency, the time and labor of replacing the ribbon cassette 3 can be saved.

What is claimed is:

1. A thermal printer comprising:

- a carriage detachably holding a selected cassette, where the selected cassette includes an ink ribbon aligned by the carriage with a thermal printing head for effecting printing on a recording sheet through the ink ribbon;
- a guide track for guiding the carriage in a direction perpendicular to a feed direction of the recording sheet;
- a carriage driver for reciprocating the carriage along the guide track;
- a cassette holder having a plurality of cassette bindings arranged in line each for detachably holding an unselected cassette, wherein a first of a pair of the carriage and one of the cassette bindings includes a pair of rigid latches for detachably holding the selected cassette by relative movements in directions of gripping and releasing the cassette, and a second of the pair of carriage and one of the cassette bindings includes a pair of elastic detents for gripping the second of the pair between the detents so that the selected cassette can be inserted into or pulled out from between the elastic detents;
- a first mechanism for moving the cassette holder between a waiting position and a delivering position while supporting the cassette holder so that the line of cassette bindings is parallel with and opposed to the guide track;
- a second mechanism for moving the latches between a cassette latched position and a detach position; and
- a power source for driving the first and second mechanisms in linked motion.

2. The thermal printer according to claim 1, wherein the waiting position is a position where the cassette holder is separated from the guide track so that the cassette mounted on the cassette holder does not contact with the cassette mounted on the carriage, and the delivering position is a position where the cassette holder comes close to the guide track so that the cassette held by the cassette holder can contact with the carriage.

3. The thermal printer according to claim 1, wherein the power source is a reversible motor, and wherein the first mechanism moves the cassette in accordance with rotation of the reversible motor, and the second mechanism selectively performs first and second operations corresponding to normal and reverse rotations of the reversible motor when the carriage is opposed to one of the cassette bindings, the first operation being an operation of releasing the cassette after the rigid latches insert the cassette between the elastic detents, and the second operation being an operation performed by the rigid latches of gripping and pulling out the cassette held by the detents.

4. The thermal printer according to claim 3, wherein the second mechanism includes a second cam having a second guide groove and rotated by the reversible motor, and a lever for causing the rigid holding motors to operate while engaging the second guide groove, the second guide groove being so shaped that the first operation is effected for the normal rotation of the reversible motor and that the second operation is effected for the reverse rotation of the reversible motor.

5. The thermal printer according to claim 1, wherein the carriage has the elastic detents and the cassette bindings have the rigid latch.

6. The thermal printer according to claim 1, wherein the power source is a reversible motor, and wherein the first mechanism includes a first cam that is rotated by the reversible motor via a first guide groove, and a link mechanism for moving the cassette holder while engaging the first guide groove, the first guide groove being so shaped as to enable the movement of the cassette holder irrespective of a rotation direction of the reversible motor.

7. The thermal printer according to claim 1, wherein the power source is a reversible motor, wherein the first mechanism includes a first cam having a first guide groove and rotated by the reversible motor, and a link mechanism for moving the cassette holder while engaging the first guide groove, and wherein the second mechanism includes a second cam having a second guide groove and rotated by the reversible motor, and a lever for moving the rigid holding members while engaging the second guide groove.

8. The thermal printer according to claim 7, wherein the first and second cams are unified as a single gear that is rotated by the reversible motor, and the first and second guide grooves are respectively formed in front and back surfaces of the gear.

9. The thermal printer according to claim 4, further comprising means for detecting a one of the cassette bindings opposed to the carriage when the cassette holder is located at the delivering position, and means for allowing the second mechanism to move the rigid latches of only the detected binding.

10. The thermal printer according to claim 1, further comprising means for tightening the ink ribbon of the cassette when the elastic detents receive the cassette from the rigid latches.

11. The thermal printer according to claim 1, wherein the cassette holder further has projecting members that project toward the guide track in place of the cassette when the corresponding elastic detents do not hold the cassette.

12. A cassette cartridge and holder assembly for a thermal printer, the assembly comprising:

the carriage having a cassette holder that aligns a selected cassette to position an ink tape contained in the selected cassette between a print head of the printer and a recording sheet in the printer;

the cassette holder having an array of cassette bindings for holding unselected cassettes, wherein the cassette holder has a first position for holding the unselected cassettes in a waiting condition, and a second position for transferring one of the cassettes held in the bindings to the carriage, a rigid latch on a first of a pair of the carriage and one of the cassette bindings, where the latch detachably grasps a cassette by relative movement between the rigid latch and the cassettes while the cassette is transferred between the binding and carriage, and at least one detent on a second of the pair of carriage and the bindings, where the detent grips the cassette, and the detent deflects to release the cassette during transfer of the cassette between the binding and carriage.

* * * * *